US010230791B2

(12) United States Patent
Han et al.

(10) Patent No.: US 10,230,791 B2
(45) Date of Patent: Mar. 12, 2019

(54) ELECTRONIC DEVICE AND METHOD FOR CONTROLLING EXECUTION OF APPLICATION IN ELECTRONIC DEVICE

(71) Applicant: Samsung Electronics Co., Ltd., Gyeonggi-do (KR)

(72) Inventors: Jong-Hyun Han, Seoul (KR); A-Reum Kim, Seoul (KR); Kyu-Ok Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 175 days.

(21) Appl. No.: 15/166,670

(22) Filed: May 27, 2016

(65) Prior Publication Data
US 2016/0352818 A1  Dec. 1, 2016

(30) Foreign Application Priority Data

May 28, 2015  (KR) ......................... 10-2015-0075344

(51) Int. Cl.
| G06F 15/16 | (2006.01) |
| H04L 29/08 | (2006.01) |
| G06F 1/3296 | (2019.01) |
| G06F 1/329 | (2019.01) |
| G06F 9/48 | (2006.01) |
| G06F 1/20 | (2006.01) |

(Continued)

(52) U.S. Cl.
CPC ............ *H04L 67/104* (2013.01); *G06F 1/206* (2013.01); *G06F 1/329* (2013.01); *G06F 1/3212* (2013.01); *G06F 1/3296* (2013.01); *G06F 9/46* (2013.01); *G06F 9/4856* (2013.01); *G06F 9/4893* (2013.01); *H04L 67/06* (2013.01); *Y02D 10/174* (2018.01); *Y02D 10/24* (2018.01)

(58) Field of Classification Search
CPC ....... H04L 67/104; H04L 67/06; G06F 1/206; G06F 1/3212; G06F 1/329; G06F 9/46; G06F 9/4856; G06F 9/4893
USPC ......................................................... 709/205
See application file for complete search history.

(56) References Cited

U.S. PATENT DOCUMENTS

| 9,271,325 B2* | 2/2016 | Backholm ............... H04L 43/10 |
| 2004/0210657 A1 | 10/2004 | Narayanan et al. |
| 2006/0153198 A1 | 7/2006 | Chadha |

(Continued)

FOREIGN PATENT DOCUMENTS

WO   WO 2013/101228   7/2013

OTHER PUBLICATIONS

European Search Report dated Nov. 7, 2016 issued in counterpart application No. 16171560.2-1957, 9 pages.

*Primary Examiner* — Kristie D Shingles
(74) *Attorney, Agent, or Firm* — The Farrell Law Firm, P.C.

(57) ABSTRACT

An electronic device and a method are provided. The electronic device includes a communication unit configured to transmit and receive data; and a controller configured to, when a state of the electronic device that satisfies a condition for termination of a running application is detected while the application is in progress, control discovery of at least one external electronic device and transmit data of the running application to at least one electronic device selected from the discovered external electronic devices through the communication unit with an instruction for the at least one selected electronic device to process the data of the running application.

20 Claims, 17 Drawing Sheets

(51) Int. Cl.
*G06F 1/3212* (2019.01)
*G06F 9/46* (2006.01)

(56) References Cited

U.S. PATENT DOCUMENTS

| | | | |
|---|---|---|---|
| 2007/0234342 A1* | 10/2007 | Flynn, Jr. | G06F 9/4856 |
| | | | 717/174 |
| 2009/0204966 A1 | 8/2009 | Johnson et al. | |
| 2012/0011511 A1 | 1/2012 | Horvitz et al. | |
| 2012/0237908 A1* | 9/2012 | Fitzgerald | G06F 21/88 |
| | | | 434/236 |
| 2013/0014115 A1 | 1/2013 | Chung et al. | |
| 2013/0137376 A1* | 5/2013 | Fitzgerald | H04B 5/0056 |
| | | | 455/41.3 |
| 2013/0151882 A1 | 6/2013 | Yamauchi et al. | |
| 2015/0058617 A1* | 2/2015 | Oishi | G06F 9/5094 |
| | | | 713/100 |
| 2015/0088957 A1 | 3/2015 | Kuo | |

* cited by examiner

ELECTRONIC DEVICE AND METHOD FOR CONTROLLING EXECUTION OF APPLICATION IN ELECTRONIC DEVICE

PRIORITY

This application claims priority under 35 U.S.C. § 119(a) to Korean Application Serial No. 10-2015-0075344, which was filed in the Korean Intellectual Property Office on May 28, 2015, the entire content of which is incorporated herein by reference.

BACKGROUND

1. Field of the Disclosure

The present disclosure relates generally to controlling the execution of applications in an electronic device, and more particularly, to an apparatus and method for terminating execution of an application in an electronic device according to a state of the electronic device.

2. Description of the Related Art

Various electronic devices that use a variety of functions related to applications have recently been developed. For example, an electronic device (e.g., smart phones) may execute applications, and may terminate the running applications according to a state of the electronic device.

A variety of electronic devices have been recently developed to use various functions. Such electronic devices may include a display unit in order to more effectively perform various functions. For example, a smart phone may include a display unit (e.g., a touch screen), which senses a touch, on the front side thereof.

A wide range of applications (also referred to as "Apps") may be installed and executed in electronic devices. Various input means (e.g., a touch screen, buttons, a mouse, a keyboard, sensors, etc.) may be used to execute and control the applications in the electronic devices.

When a running application is forced to terminate according to the state of the electronic device, the application data that is used by the application at the time of the termination may be deleted. In order to re-execute the application data that has been deleted upon the forcible termination of the application, the user should repeat the operation of executing the application and inputting the deleted data, which may be tiresome for the user.

SUMMARY

An aspect of the present disclosure is to address at least the above-mentioned problems and/or disadvantages and to provide at least the advantages described below.

Another aspect of the present disclosure is to provide an electronic device and a method for controlling the execution of the application in the electronic device, such that, when the state of the electronic device, which is related to the termination of the application, is detected, the data of a running application may be transmitted to one or more peripheral devices and the one or more peripheral devices may process the transmitted application data.

In accordance with an aspect of the present disclosure, an electronic device is provided. The electronic device includes a communication unit configured to transmit and receive data; and a controller configured to, when a state of the electronic device that satisfies a condition for termination of a running application is detected while the application is in progress, control discovery of at least one external electronic device and transmit data of the running application to at least one electronic device selected from the discovered external electronic devices through the communication unit with an instruction for the at least one selected electronic device to process the data of the running application.

In accordance with another aspect of the present disclosure, an electronic device is provided. The electronic device includes a communication unit configured to transmit and receive data; and a controller configured to, when data of a first application is received from an external electronic device through the communication unit, execute a second application that is related to the received data of the first application, and process the received data of the first application through the executed second application, wherein the received data of the first application is the data of an application that is in progress in the external electronic device and that is transmitted to the electronic device according to a state of the external electronic device.

In accordance with another aspect of the present disclosure, a method for controlling the execution of an application in an electronic device is provided. The method includes executing the application in the electronic device; discovering, when a state of the electronic device that satisfies a condition for termination of the running application, is detected, at least one external electronic device; and transmitting data of the running application to at least one electronic device selected from the at least one discovered external electronic device with an instruction for the at least one selected electronic device to process the data of the running application.

In accordance with another aspect of the present disclosure, a method for controlling the execution of an application in an electronic device is provided. The method includes receiving data of a first application from an external electronic device; executing a second application that is related to the received data of the first application; and processing the received data of the first application through the executed second application, wherein the received data of the first application is data of an application that is in progress in the external electronic device and that is transmitted to the electronic device according to the state of the external electronic device.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
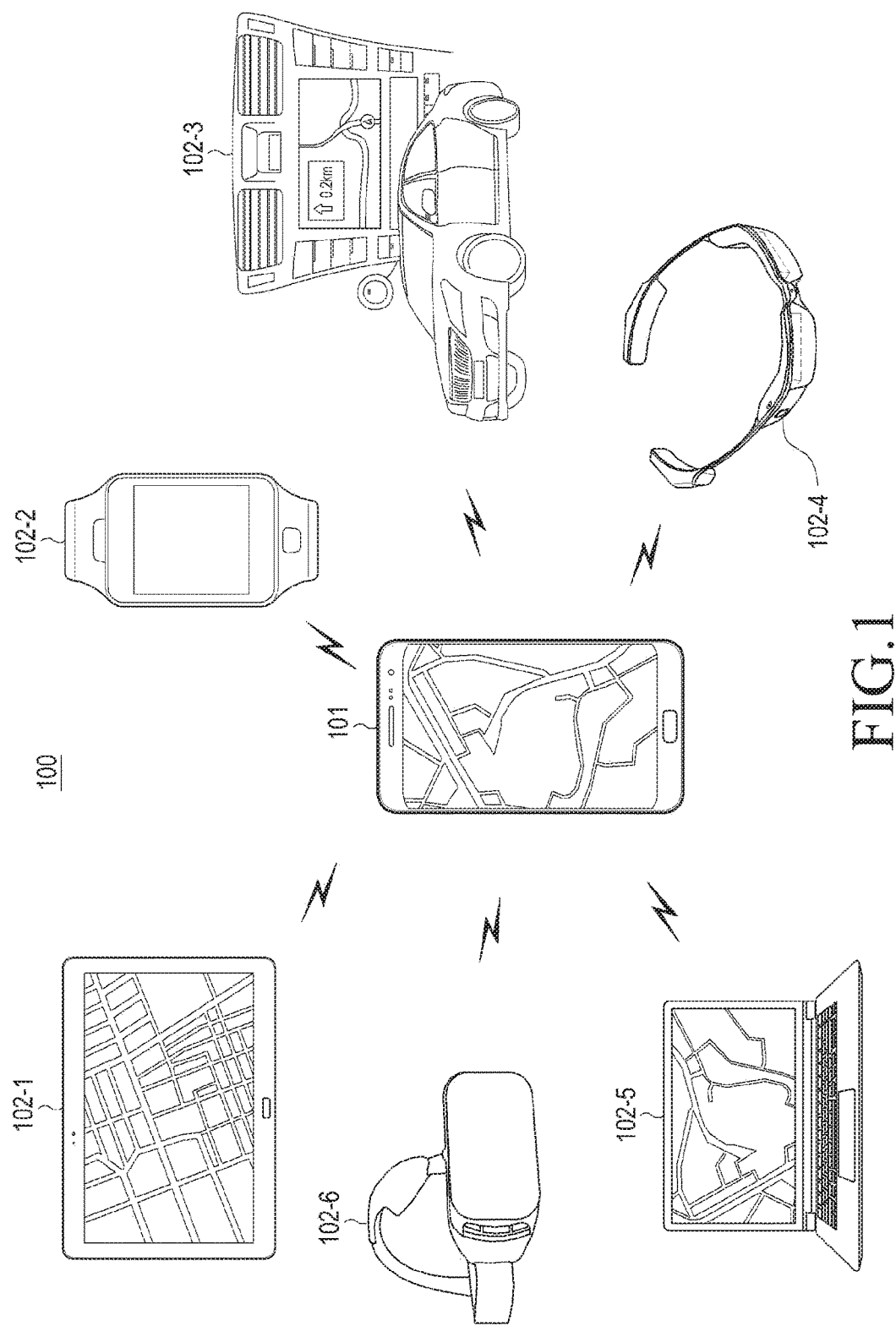
FIG. 1 is a diagram illustrating a network environment, according to an embodiment of the present disclosure.

Hereinafter, embodiments of the present disclosure are disclosed with reference to the accompanying drawings. However, there is no intent to limit the present disclosure to the particular embodiments disclosed herein. The present disclosure should be construed to cover various modifications, equivalents, and/or alternatives of embodiments of the present disclosure. With respect to the drawings, the same or similar reference numerals may be used to designate the same or similar constituent elements.

Herein, terms such as "have", "may have", "include", and "may include" refer to the existence of a corresponding feature (e.g., numeral, function, operation, or constituent element such as component), but do not exclude one or more additional features.

Herein, expressions such as "A or B", "at least one of A or/and B", and "one or more of A or/and B" may include all possible combinations of the listed items. For example, "A or B", "at least one of A and B", and "at least one of A or B" may refer to any of combinations (1) including at least one A, (2) including at least one B, or (3) including all of at least one A and at least one B.

Expressions such as "a first", "a second", "the first", and "the second", as used herein, may modify various components regardless of the order and/or the importance of the elements, but do not limit the corresponding components. For example, a first user device and a second user device may indicate different user devices, while both are user devices. For example, a first element may be referred to as a second element, and similarly, a second element may be referred to as a first element without departing from the scope of the present disclosure.

When an element (e.g., a first element) is referred to as being (operatively or communicatively) "connected," or "coupled," to another element (e.g., a second element), the first element may be directly connected or coupled directly to the second element or any other element (e.g., a third element) may be interposer between them. By contrast, when an element (e.g., a first element) is referred to as being "directly connected," or "directly coupled" to another element (e.g., a second element), there are no other elements (e.g., a third element) interposed between the first and second elements.

The expression "configured to", as used herein, may be interchangeable used with, for example, "suitable for", "having the capacity to", "designed to", "adapted to", "made to", or "capable of" according to the situation. The term "configured to" does not necessarily imply "specifically designed to" with respect to hardware. Alternatively, in some situations, the expression "device configured to" may indicate that the device, together with other devices or components, "is able to" perform a corresponding operation. For example, the phrase "processor adapted (or configured) to perform A, B, and C" may refer to a dedicated processor (e.g. an embedded processor) used only for performing the corresponding operations or a generic-purpose processor (e.g., a central processing unit (CPU) or application processor (AP)) that can perform the corresponding operations by executing one or more software programs stored in a memory device.

The terms used in the present disclosure are merely used to describe specific embodiments, and are not intended to limit the present disclosure. As used herein, singular forms of terms may include plural forms as well, unless the context clearly indicates otherwise. Unless defined otherwise, all terms used herein, including technical and scientific terms, have the same definitions as those commonly understood by a person skilled in the art to which the present disclosure pertains. Such terms as those defined in a generally used dictionary may be interpreted to have definitions equivalent to the contextual definitions in the relevant field of art, and are not to be interpreted to have ideal or excessively formal definitions, unless clearly defined in the present disclosure. In some cases, even terms defined in the present disclosure should not be interpreted to exclude embodiments of the present disclosure.

An electronic device according to an embodiment of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a motion picture experts group (MPEG)-1 audio layer-3 (MP3) player, a mobile medical device, a camera, and a wearable device. A wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to an embodiment of the present disclosure, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box, a game console, an electronic dictionary, an electronic key, a camcorder, and an electronic photo frame.

According to an embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller machine (ATM) for banks, a point of sales (POS) device in a shop, or an Internet of Things device (e.g., a light bulb, various sensors, electric or gas meter, a sprinkler device, a fire alarm, a thermostat, a streetlamp, a toaster, a sporting goods, a hot water tank, a heater, a boiler, etc.).

According to an embodiment of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to an embodiment of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to developments in technology.

According to an embodiment of the present disclosure, applications (e.g., application programs) may include one or more applications that may perform a function of home, a dialer, messaging {short message service (SMS), multimedia messaging service (MMS), or instant messaging (IM)}, a browser, a camera, an alarm, a contact list, voice dialing, e-mail, a calendar, media reproduction, an album, watches, healthcare (e.g., measuring the amount of exercise, movement, blood pressure, weight, body fat, blood glucose level, etc.), a global positioning system (GPS), a planner, a word processor (e.g., notes or memos), or providing environmental information (e.g., providing atmospheric pressure, humidity, or temperature information).

According to an embodiment of the present disclosure, an application may be performed in a task unit. For example, the task may include one or more activities that perform independent functions through one or more layouts, and may be displayed as a unit constituting one frame of an image or may be executed in the background.

According to an embodiment of the present disclosure, the data of an application may include a variety of information necessary for executing the application in the electronic device, such as information on the task that is performed at a specific time, identification information of the application that is able to process the data, etc.

According to an embodiment of the present disclosure, a task information may include a variety of information for executing the data of the application, which is in progress (i.e., currently executing) at a specific time, in the peripheral device, such as identification information of one or more activities to be called, information indicating whether the application is executed in the background, information indicating whether there is a file to be executed, layout or resolution information for displaying the activities, information on the data that is input into each activity, or access URL information.

For example, the data information may include the data that is input through the task, as information indicating the type of data, information that indicates at least one of text data, image data, media data, user input data, file data, or sensor data, and a variety of information that is related to the format of the data.

According to an embodiment of the present disclosure, the electronic device may sense a state of the electronic device that satisfies a condition for termination of the application. For example, the state of the electronic device in relation to the termination of the application may include the state of the remaining amount of a battery (for example, 5% or less of the total battery capacity), the temperature of the electronic device (for example, the surface temperature of a communication unit or a battery is more than 50° C.), the mounting state of an accessory (for example, earphones, VR devices, etc.), or the communication state, and the applications in progress may be forced to terminate depending on the various states of the electronic device.

According to an embodiment of the present disclosure, the peripheral device may include a variety of electronic devices that are located outside the electronic device and are able to be connected with the electronic device through wired/wireless communication.

Hereinafter, an electronic device and a method for controlling execution of the application in the electronic device, according to an embodiment of the present disclosure, will be described with respect to the accompanying drawings. In present specification, the term "user" may refer to a person who uses the electronic device or an apparatus (for example, artificial intelligence electronic devices) that uses the electronic device.

FIG. 1 is a diagram illustrating a network environment, according to an embodiment of the present disclosure.

Referring to FIG. 1, a network environment 100 includes an electronic device 101 and N peripheral devices 102-1 through 102-N (i.e., 102-1 through 102-6 in the present example). The electronic device 101 and the peripheral devices 102-1 through 102-6 may be connected with each other through short-range communication (such as, WiFi, WiFi Direct, near field communication (NFC), digital living network alliance (DLNA), Bluetooth, or Bluetooth Low Energy (BLE)), and may be connected with each other through various wired/wireless networks.

According to an embodiment of the present disclosure, the peripheral devices 102-1 through 102-6 may include a variety of devices that include a communication module to communicate with the electronic device 101, as well as tablet personal computers (PCs), smart watches, smart cars, smart glasses, laptop personal computers, virtual reality (VR) devices, etc.

The first peripheral device 102-1 (for example, a tablet PC) may include electronic devices that adopt a display that is larger than that of the electronic device 101 and is able to detect a touch input.

According to an embodiment of the present disclosure, when a state of the electronic device 101 that satisfies a condition for termination of the application in progress in the electronic device 101 is detected, the first peripheral device 102-1 is a tablet PC that may receive, from the electronic device 101, application data that is to be displayed at a high resolution.

The second peripheral device 102-2 is a smart watch that includes a communication module. For example, the second peripheral device 102-2 may include sensors for detecting the data related to the user's health.

According to an embodiment of the present disclosure, when a state of the electronic device 101 that satisfies a condition for termination of the application in progress in the electronic device 101 is detected, the second peripheral device 102-2 may receive, from the electronic device 101, application data that requests the detection of data related to health.

The third peripheral device 102-3 is a smart car that includes a communication module and a display. For example, the peripheral device 102-3 may be used with any of various devices that may be driven on the road, such as motorcycles, cars, trucks, trains, bicycles, etc.

According to an embodiment of the present disclosure, when a state of the electronic device 101 that corresponds to the termination of the application in progress in the electronic device 101 is detected, the third peripheral device 102-3 may receive, from the electronic device 101, application data that contains information that is related to a vehicle operation, such as location information, map information, etc.

The fifth peripheral device 102-5 is a laptop PC that is portable, and may include a higher-capacity battery or a higher-resolution display than the electronic device 101, and may process a large amount of data.

According to an embodiment of the present disclosure, when a state of the electronic device 101 that satisfies a condition for termination of the application in progress in the electronic device 101 is detected, the fifth peripheral device 102-5 may receive application data of a high resolution or high capacity from the electronic device 101 in order to thereby process the data of the applications that is in progress in the electronic device 101.

The sixth peripheral device 102-6 is a VR device that processes real images as virtual images, or adds virtual images to real images to then be displayed.

According to an embodiment of the present disclosure, when a state of the electronic device 101 that corresponds to the termination of the application in progress in the electronic device 101 is detected, the sixth peripheral device 102-6 may receive application data that is related to a created virtual image, from the electronic device 101 in order to thereby display various screens by displaying the transmitted virtual image or by adding the same to the real image.

According to an embodiment of the present disclosure, when a status of the electronic device 101 that satisfies a condition for termination of the application in progress in the electronic device 101 is detected, data of various applications may be transmitted to various peripheral devices as well as the peripheral devices described above. For example, the electronic device 101 may select one of the peripheral devices as an electronic device that is to process the application data according to the type of application, the status of the electronic device 101, the type of task, or information on the data contained in the task.

Figure 2:
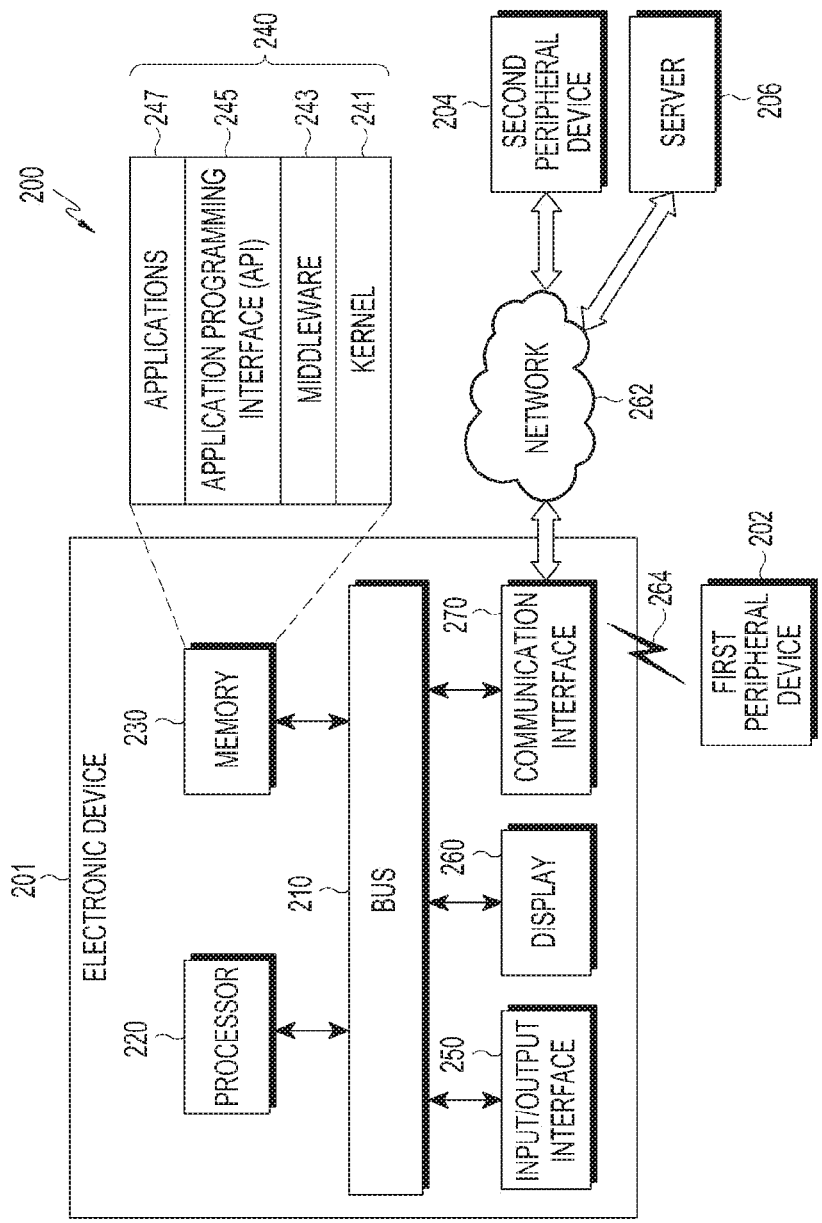
FIG. 2 is a diagram illustrating a network environment, according to an embodiment of the present disclosure.

FIG. 2 is a diagram illustrating a network environment, according to an embodiment of the present disclosure.

Referring to FIG. 2, an electronic device 201 is included in a network environment 200. The electronic device 201 includes a bus 210, a processor 220, a memory 230, an input/output interface 250, a display 260, and a communication interface 270.

The electronic device 201 may exclude one or more of the above-listed elements or may add other elements thereto in accordance with embodiments of the present disclosure.

The bus 210 may include a circuit for connecting the elements 210 to 270 with each other and transferring communication data (e.g., control messages and/or data) between the elements.

The processor 220 may include at least one of a central processing unit (CPU), an application processor (AP), or a communication processor (CP). The processor 220, for example, may process a calculation or data related to the control and/or communication of one or more other elements of the electronic device 201.

According to an embodiment of the present disclosure, the processor 220 may execute one or more applications, and when a state of the electronic device 101 that corresponds to the termination of a running application is detected, the processor 220 may transmit the data of the running application to the peripheral device.

According to an embodiment of the present disclosure, the processor 220 may select at least one of the first peripheral electronic device 202 and the second peripheral electronic device 204, which are connected to the electronic device 201, as an electronic device to which the data of the running application is to be transmitted.

The memory 230 may include a volatile and/or non-volatile memory. For example, the memory 230 may store instructions or data related to one or more other elements of the electronic device 201.

According to an embodiment of the present disclosure, the memory 230 stores software including programs 240. For example, the programs 240 include a kernel 241, middleware 243, an application programming interface (API) 245, and application programs (also referred to as "applications") 247. At least some of the kernel 241, the middleware 243, or the API 245 may be referred to as an operating system (OS).

According to an embodiment of the present disclosure, the memory 230 may store a variety of information that is related to the application data. For example, the memory 230 may store data of the running applications and a variety of information for transmitting the data of the running application to the peripheral devices.

The kernel 241 may control or manage system resources (e.g., the bus 210, the processor 220, or the memory 230), which are used to execute the operation or function that is implemented in other programs (e.g., the middleware 243, the API 245, or the application program 247). For example, the kernel 241 may provide an interface by which the middleware 243, the API 245, or the application programs 247 may access each element of the electronic device 201 for control or management.

The middleware 243 may play an intermediary role between the API 245 or the application programs 247 and the kernel 241, to enable these elements to communicate with each other for transmission and reception of data. For example, the middleware 243 may process one or more operation requests received from the application program 247 according to a priority. For example, the middleware 243 may give priority for using the system resources of the electronic device 201 to the one or more application programs 247. For example, the middleware 243 may perform scheduling or load-balancing for the one or more operation requests by processing the one or more operation requests according to the priority given to the one or more application programs 247.

The API 245 may include an interface by which the application programs 247 control functions that are provided by the kernel 241 or the middleware 243. For example, the API 245 may include one or more interfaces or functions (e.g., instructions) for file control, window control, image processing, or text control.

The input/output interface 250 may operate an interface that transfers instructions or data received from a user or other external devices to other elements of the electronic device 201. For example, the input/output interface 250 may output instructions or data received from the other elements of the electronic device 201 to the user or the other external devices.

The display 260 may include a liquid crystal display (LCD), a light-emitting diode (LED) display, an organic LED (organic light-emitting diode) display, a micro-electromechanical system (MEMS) display, an electronic paper display, or a touch screen. For example, the display 260 may display a variety of content (e.g., text, images, videos, icons, symbols, etc.) to the user.

According to an embodiment of the present disclosure, the display 260 may receive a touch input, a gesture input, a proximity input, or a hovering input, by using electronic pens or a user's body part, through the touch screen.

The communication interface 270 may configure communication between the electronic device 201 and external devices (e.g., the first peripheral device 202, the second peripheral device 204, or a server 206). For example, the communication interface 270 may be connected to the network 262 through wireless communication or wired communication in order to thereby communicate with the external devices (e.g., the first peripheral device 202, the second peripheral device 204, or server 206).

For example, the wireless communication may use, as a cellular communication protocol, at least one of long-term evolution (LTE), LTE-Advance (LTE-A), code division multiple access (CDMA), wideband CDMA (WCDMA), a universal mobile telecommunications system (UMTS), wireless broadband (WiBro), Global System for Mobile Communications (GSM), etc.

For example, the wireless communication may include a short-range communication 264. The short-range communication 264 may include at least one of WiFi, Bluetooth, NFC, or a global navigation satellite system (GNSS). The GNSS may include at least one of a global positioning system (GPS), a global navigation satellite system, such as Glonass, the Beidou Navigation Satellite System (hereinafter, "Beidou"), the Galileo system (i.e., the European global satellite-based navigation system), according to the usage area or bandwidth.

For example, the wired communication may include at least one of a universal serial bus (USB) interface, a high definition multimedia interface (HDMI), recommended standard 232 (RS-232), or a plain old telephone service (POTS).

The network 262 may include at least one of telecommunication network, such as a computer network (e.g., local area network (LAN) or wide area network (WAN)), the Internet, or a telephone network.

The first peripheral device 202 and the second peripheral device 204 may be the same or different type of device as the electronic device 201.

The server 206 may include a group of one or more servers.

According to an embodiment of the present disclosure, at least some of the operations that are executed in the electronic device 201 may be executed by the first peripheral device 202, the second peripheral device 204, and/or the server 206.

According to an embodiment of the present disclosure, when the electronic device 201 executes a specific function or service automatically or by request, the electronic device 201 may make a request to the first peripheral device 202, the second peripheral device 204, and/or the server 206 for at least some of the functions related to the function or service additionally or instead of executing the same by itself. The first peripheral device 202, the second peripheral device 204, and/or the server 206 may execute the requested function or additional function, and may deliver the result thereof to the electronic device 201. The electronic device 201 may provide the requested function or service by providing the result or by additionally processing the same. To this end, for example, cloud computing, distributed computing, or client-server computing technology may be used.

Figure 3:
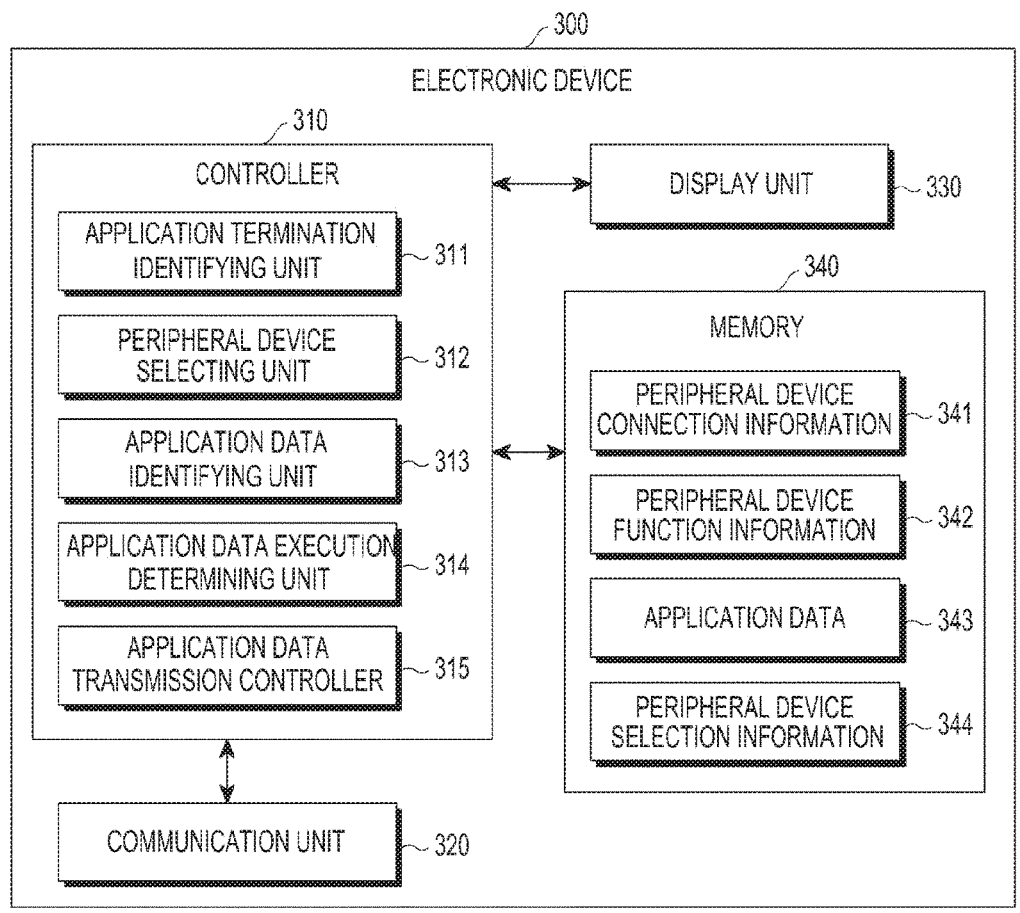
FIG. 3 is a block diagram illustrating a configuration of an electronic device, according to an embodiment of the present disclosure.

FIG. 3 is a block diagram illustrating a configuration of an electronic device, according to an embodiment of the present disclosure.

Referring to FIG. 3, an electronic device 300 includes a controller 310, a communication unit 320, a display unit 330, and a memory 340.

The controller 310 includes an application termination identifying unit 311, a peripheral device selecting unit 312, an application data identifying unit 313, an application data execution determining unit 314, and an application data transmission controller 315.

The application termination identifying unit 311 may identify an application that is terminated according to various states of the electronic device 300. For example, the states of the electronic device may include a state of a remaining amount of a battery, the heated state of the electronic device, the mounting state of an accessory (e.g., earphones, VR devices, etc.), or the communication state, and the applications in progress may be terminated depending on the various states of the electronic device.

According to an embodiment of the present disclosure, the application termination identifying unit 311 may identify the application that is terminated according to the state of the electronic device. For example, if the remaining amount of a battery is less than or equal to a predetermined value, or if the heated state (i.e., a temperature measured with respect to the electronic device 300) is at least equal to a predetermined value, all applications that are in progress may be terminated. Alternatively, if an accessory is mounted or removed, execution of the application for processing data related to the accessory may be terminated due to the mounting or removal of accessory. Alternatively, if a power saving mode is configured, execution of an application for processing an amount of data that is at least equal to a predetermined value may be terminated.

According to an embodiment of the present disclosure, the application termination identifying unit 311 may identify whether a current communication state corresponds to the state in which an application that is executed through a communication network (e.g., Bluetooth, or a cellular network) is to be terminated. For example, if the signal intensity of the communication network is too low to execute the application, or if the communication network is disconnected, applications that are in progress and that rely upon the communication network, may be terminated.

According to an embodiment of the present disclosure, if the application termination identifying unit 311 detects a state of the electronic device 300 in which an application in progress in the electronic device 300 is to be terminated, the application termination identifying unit 311 may require the application data identifying unit 313 to identify the data of the application to be terminated, and may require the peripheral device selecting unit 312 to select a peripheral device to which the identified application data is transmitted.

The peripheral device selecting unit 312 may identify one or more peripheral devices that are connected with the electronic device 300, and may select one of the identified peripheral devices as an electronic device to which the data of the running application is transmitted, based on one or more criteria. For example, the one or more criteria may include at least one of the type of application, the state of the electronic device 300, information regarding a task performed by the application, etc.

According to an embodiment of the present disclosure, the one or more criteria may be given priority according to the data of the running application, and the peripheral device selecting unit 312 may select, as a peripheral device to which the application data is to be transmitted, one or more peripheral devices that has a higher priority than other peripheral devices that satisfy the same number of criteria.

According to an embodiment of the present disclosure, if more than a predetermined number of the selected peripheral devices are discovered, or if it is impossible to identify information regarding the peripheral devices, the peripheral device selecting unit 312 may send a request to a server for information regarding the peripheral devices. For example, the peripheral device selecting unit 312 may select, as a peripheral device to which the application data is transmitted, a peripheral device that is related to account information of the electronic device 300 that is received from the server.

According to an embodiment of the present disclosure, when a running media player application is terminated according to the mounting state of an accessory or the remaining amount of a battery, the peripheral device selecting unit 312 may select a device that adopts a media play function (e.g., a speaker or earphones) among the peripheral devices as an electronic device to which the data of the media player application is to be transmitted.

When a state of the electronic device 300 is a state that that corresponds to a condition for an application in progress in the electronic device 300 is to be terminated is detected, the application data identifying unit 313 may identify the data of the application that is in progress in the electronic device 300.

According to an embodiment of the present disclosure, the application data identifying unit 313 may identify identification information of each of running applications of the electronic device 300, information regarding the task that is in progress for each application, layout information, or resolution information.

The application data execution determining unit 314 may determine whether one or more peripheral devices are able to process the data of the running application.

According to an embodiment of the present disclosure, the application data execution determining unit 314 may transmit a confirmation request signal that contains the data information of the running application to one or more peripheral devices that are connected with the electronic device 300, and may determine one or more peripheral devices, which respond to the transmitted signal, to be a peripheral device that can process the application data.

The application data transmission controller 315 may transmit the data of the running applications to the one or more peripheral devices that are selected by the peripheral device selecting unit 312. For example, the transmitted data of the applications may include identification information (e.g., an identification (ID) or package information) of the application for processing the corresponding data or task information at the time of execution.

The communication unit 320 may communicate with external devices (e.g., peripheral devices and/or a server), and may transmit the application data in progress to one or more peripheral devices. For example, the communication unit 320 may transmit the data of the running application to a server so that the one or more peripheral devices may receive the same through the server, or may transmit the same through a communication network that is connected with the one or more peripheral devices.

According to an embodiment of the present disclosure, the communication unit 320 may transmit, to the server, a confirmation request signal in order to select an external device to which the application data of the electronic device 300 is transmitted, and may receive a response to the confirmation request signal from the server.

According to an embodiment of the present disclosure, the communication unit 320 may transmit a confirmation request signal to one or more external devices (e.g., the peripheral devices), and may receive a response signal in response to the request signal. For example, the request signal may contain information that requests the confirmation regarding whether specific application data is able to be executed.

According to an embodiment of the present disclosure, the communication unit 320 may transmit application data is identified through the application data identifying unit 313, to the external device (e.g., an external memory or an account server that is connected with the electronic device 300) to then be stored.

The display unit 330 may display a screen of a running application. For example, the screen of a running application may include data contained in the task that is in progress at a particular time. For example, the data may contain at least one piece of text data, image data, media data, user input data, file data, or sensor data, and may further contain various types of data.

The memory 340 stores peripheral device connection information 341, peripheral device function information 342, application data 343, and peripheral device selection information 344.

The peripheral device connection information 341 may contain information regarding peripheral devices that have been previously connected with the electronic device 300, or that are currently in connection with the electronic device 300.

The peripheral device function information 342 may contain function information on each of the connected peripheral devices. For example, the function information may contain a variety of information that is related to functions required to process the application data in the peripheral devices, such as information on sensors included in the corresponding peripheral device, application information, display information, or communication information. For example, the function information of the peripheral devices may be stored by the manufacturer, or may be obtained by accessing the account of the manufacturer or by performing a connection (e.g., pairing) with the peripheral device.

The application data 343 may contain data of one or more applications that are executed in the electronic device 300. For example, the application data may contain a variety of information necessary for executing an application in the peripheral device, such as information regarding a task that is executed at a specific time, or identification information of an application capable of processing corresponding data.

According to an embodiment of the present disclosure, the data of the application, which can be executed in the electronic device 300, may contain a variety of information in relation to execution of the application.

For example, data of a phone application (e.g., a dialer or a call application) may contain a file that contains recent log information or a contact list. Data of a messaging application may contain information regarding activity for transmitting/receiving messages to/from other users, execution information (e.g., message thread) for transmitting/receiving messages, or a keyboard file for inputting text data.

Data of an alarm application may contain information related to an alarm configuration, such as an alarm-set time, the number of alarms, or alarm sound information, a timer-set time, timer-set information that was previously set.

Data of a planner application is used to manage a schedule of the user, and may contain set schedule information, set event information, information on the task to be carried out, or information on a reminding time and method of the information.

Data of a GPS application may contain information on sensors to sense GPS information, user position data that is detected through the sensors, map information, or data on health tracking for the user's health information (such as, the amount of exercise) based on the detected position data.

Data of a healthcare application may contain data related to health information (e.g., the amount of exercise, movement, blood pressure, weight, body fat, sleep, blood glucose level, etc.), which is detected through one or more sensors (e.g., a UV sensor, a motion sensor, a pedometer, etc.), and information to call an activity for tracking the health information.

Data of a media player application may contain media files that contain at least one of videos, music, or images that are being played, information on a play list that contains one or more media files to be played, purchase history information on the media files, or information indicating whether the media files are stored in a server.

Data of a word processor application (e.g., a notes application or a memos application) may contain memo or note data files that have been previously stored, or may contain a command to call an activity for the word-processing in progress.

Data of a browser application may contain uniform resource locator (URL) information of one or more web pages that are output through the browser application, bookmark, favorite information, or layout information of applications. Application data may contain task information on one or more applications that can execute functions, such as a camera, a contact list, voice dialing, e-mail, a calendar, an album, a watch, or the provision of environmental information (e.g., providing atmospheric pressure, humidity, or temperature information).

The peripheral device selection information 344 may contain information for selecting a peripheral device to which the application data is to be transmitted from among one or more peripheral devices. For example, the peripheral device selection information 344 may contain information that is related to one or more criteria to select the peripheral device, the priority of the criteria, or the number of criteria required to select the peripheral device. For example, the one or more criteria may contain at least one of the type of application, the state of the electronic device 300, the type of task, or information on the data contained in the task.

According to an embodiment of the present disclosure, when a state of the electronic device 300 corresponds to a condition for terminating an application in progress in the electronic device 300 is detected, applications that are capable of processing the corresponding application data may be identified, and one or more peripheral devices that satisfy reference information that is configured for each of the identified applications may be selected based on the selection information 344.

According to an embodiment of the present disclosure, the electronic device 300 may transmit the application data to external peripheral devices; allow the external peripheral devices to execute an application that has been terminated according to a state of the electronic device 300; and access the external electronic devices (e.g., a server 500, a user account server, or a cloud server) to then identify the data of the application that is processed by the peripheral device and stored in the external electronic device.

Figure 4:
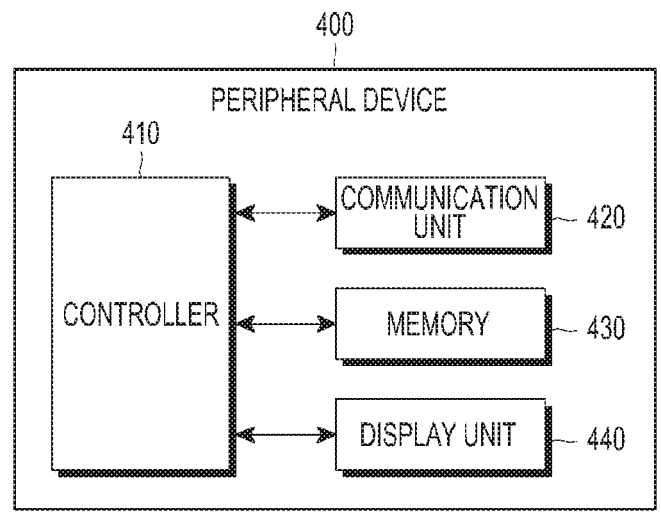
FIG. 4 is a block diagram illustrating a configuration of a peripheral device, according to an embodiment of the present disclosure.

FIG. 4 is a block diagram illustrating a configuration of a peripheral device, according to an embodiment of the present disclosure.

Referring to FIG. 4, a peripheral device 400 includes a controller 410, a communication unit 420, a memory 430, and a display unit 440.

When application data is transmitted from an external device, the controller 410 may execute an application that is able to process the transmitted application data, and may control processing of the transmitted application data or overall operations of the peripheral device 400.

According to an embodiment of the present disclosure, when the application data transmitted from the external device is identified, the controller 410 may require the user to determine whether the data is to be processed, in order to thereby determine the manner in which the application data transmitted from the external device will be processed. For example, the request for the user to determine whether the data is to be processed may be displayed in the form of a message through the display unit 440.

According to an embodiment of the present disclosure, if the controller 410 receives, from the external device, a request for a confirmation indicating whether a specific application data is executable, the controller 410 may control a response to the received confirmation request. For example, the controller 410 may determine whether the specific application data can be processed in the peripheral device 400, and may control the communication unit 420 to transmit the determination result to the corresponding electronic device.

According to an embodiment of the present disclosure, the controller 410 may identify layout information or resolution information of an activity to be called, which is contained in the received application data, and may control to configure a screen of the activity to be called according to the size of the display unit 440 or the capacity of the memory 430, and to then display the same.

The communication unit 420 may communicate with external devices.

According to an embodiment of the present disclosure, the communication unit 420 may receive the confirmation request from the external devices; transmit a response to the confirmation request; or receive one or more pieces of application data transmitted from the external devices. For example, the confirmation request may contain information that requests the determination indicating whether a specific application is executable.

The memory 430 may store one or more applications, information to execute the one or more applications in the peripheral device 400, or information to process the received application data.

According to an embodiment of the present disclosure, the data that is processed, executed, or created upon the receipt of the application data by the peripheral device 400 may be stored in the memory 430, or may be stored in an account server to which the electronic device that transmits the application data and the peripheral device 400 are connected with.

The display unit 440 may display the application data received from the external devices.

According to an embodiment of the present disclosure, the peripheral device 400 may identify the received application data and the information contained in the data in order to thereby process the received application data. For example, the processed data may be stored in an account server that is connected with the electronic device that transmits the application data.

According to an embodiment of the present disclosure, even when a running application is terminated according to a state of the electronic device, the user of the electronic device that has transmitted the application data may elect to have the data processed through the peripheral device 400. After that the data is processed in the peripheral device 400, the user may identify the data processed in the peripheral device 400 through the electronic device accessed to the account server.

According to an embodiment of the present disclosure, when an application in progress in the external electronic device is terminated according to a state of the electronic device 300, the peripheral device 400 may receive the data of the application that is in progress in the external electronic device to thereby process the received application data.

For example, when the data of a notification transfer application is received, the controller 410 may check information contained in the received data in order to thereby identify notification information that is configured to process specific content at a specific time. The controller 410 may control the peripheral device 400 to display or output configured content at a configured alarm time based on the notification information When the data of a healthcare application is received, the controller 410 may identify movement information of the peripheral device 400 and a command to call an activity for measuring the location or route of the peripheral device 400 through the information contained in the received data.

The controller 410 may activate sensors included in the peripheral device 400 to measure location or route information of the electronic device 400 in order to thereby measure a motion or exercise of the user.

Figure 5:
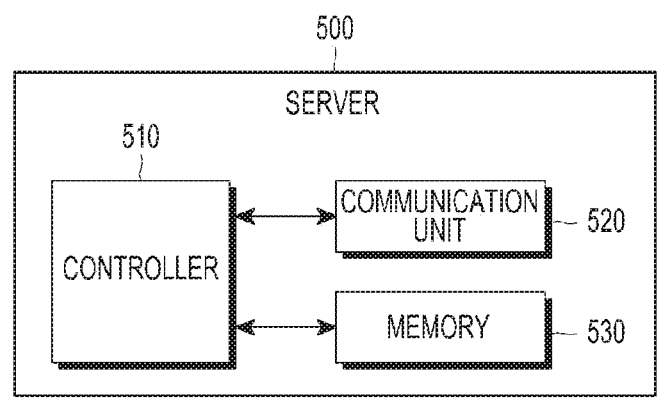
FIG. 5 is a block diagram illustrating a configuration of a server, according to an embodiment of the present disclosure.

FIG. 5 is a block diagram illustrating a configuration of a server, according to an embodiment of the present disclosure.

According to an embodiment of the present disclosure, a server 500 may receive, from an external electronic device (e.g., the electronic device 300), connection information regarding peripheral devices related to the electronic device, and may store the received information. For example, the server 500 may store received information for each of a plurality of user accounts.

Referring to FIG. 5, the server 500 includes a controller 510, a communication unit 520, and a memory 530.

If the controller 510 receives an information confirmation request for the peripheral devices from the external device, the controller 510 may identify account information of the electronic device that is connected with the received peripheral devices, and may control the overall operations of the server 500.

The communication unit 520 may receive data information regarding a running application or a confirmation request for the peripheral devices from an external electronic device (e.g., the electronic device 300 or the peripheral device 400. For example, the confirmation request may contain a request for an indication of whether connection information between a specific peripheral device and the electronic device is contained in account information of the external electronic device.

According to an embodiment of the present disclosure, the communication unit 520 may transmit, to the electronic device, information indicating whether one or more peripheral devices is connected through the account of the corresponding electronic device.

The memory 530 may store, for each of a plurality of user accounts, information on the peripheral devices connected with the electronic device, or may store data information regarding an application that is received from the electronic device 300 or the peripheral device 400.

For example, when the electronic device 300 and one or more peripheral devices 400 are connected with each other, the memory 530 may store information on the electronic device 300 and information stating that one or more peripheral devices 400 are connected with the electronic device 300 in the account information connected to each electronic device 300.

According to an embodiment of the present disclosure, when a running application is terminated in the electronic device 300 according to a state of the electronic device 300, the data of the running application may be transmitted to the peripheral device 400, and the application data processed in the peripheral electronic device 400, may be transmitted to the server 500 to then be stored in the memory 530.

According to an embodiment of the present disclosure, the electronic device 300 may execute the terminated application again, and may access the server 500 in order to thereby identify the application data that has been processed by the peripheral electronic device 400 and stored in the memory 530.

Figure 6:
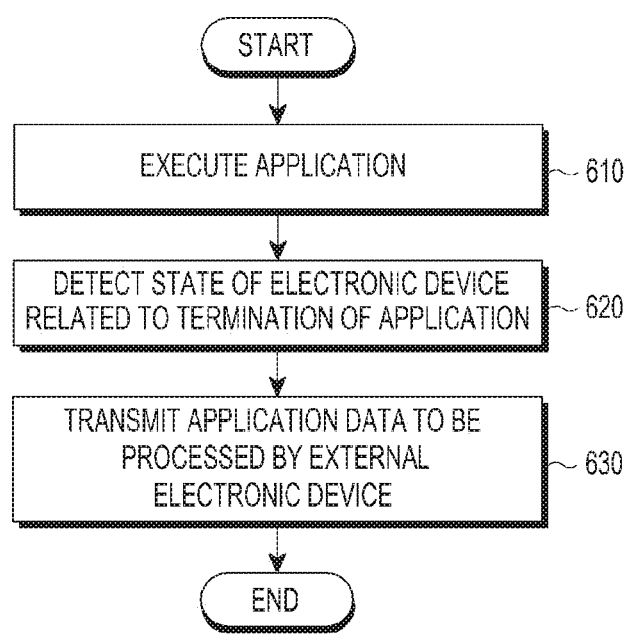
FIG. 6 is a flowchart illustrating a method of controlling execution of an application in an electronic device, according to an embodiment of the present disclosure.

FIG. 6 is a flowchart illustrating a method of controlling execution of an application in an electronic device, according to an embodiment of the present disclosure.

In step 610, an electronic device detects a state of the electronic device that satisfies a condition for termination of the application that is in progress in the electronic device.

In step 620, the electronic device identifies one or more applications that are in progress in the electronic device and the data of the applications.

According to an embodiment of the present disclosure, the identified application data may be stored in the electronic device, in the account server of the electronic device, or in other external devices.

In step 630, the electronic device identifies one or more peripheral devices to which the identified data is transmitted. For example, the electronic device may select one or more peripheral devices that are able to process the data of the running application, from among the peripheral devices that are connected with the electronic device.

According to an embodiment of the present disclosure, if more than a predetermined number of peripheral devices that can process the data of the running application are discovered, the electronic device may select, as the peripheral device to which the data of the running application is to be transmitted, a peripheral device that satisfies more than the predetermined number of criteria or satisfies a higher priority of criterion.

In step 640, the electronic device transmits the data of the running application to the one or more identified peripheral devices. For example, the application data may contain a variety of information necessary for processing the data of the running application in the peripheral devices, as well as information regarding a task that is executed at a specific time or identification information of the application.

Figure 7:
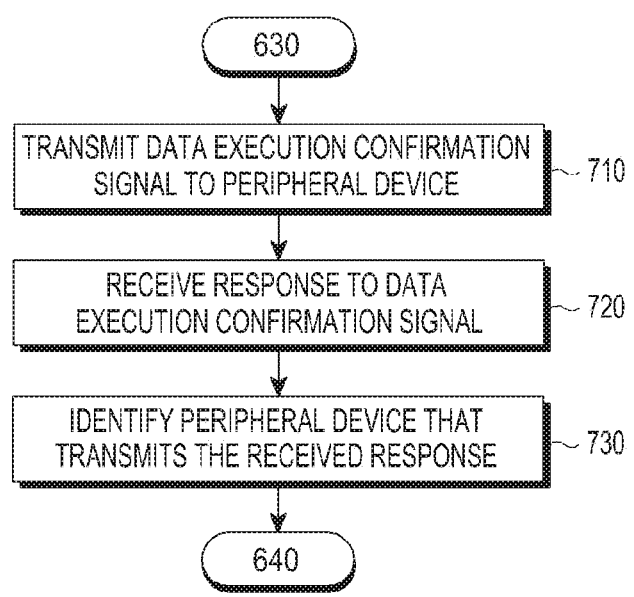
FIG. 7 is a flowchart illustrating a method of controlling execution of an application in an electronic device, according to an embodiment of the present disclosure.

FIG. 7 is a flowchart illustrating a method of controlling execution of an application in an electronic device, according to an embodiment of the present disclosure.

Referring to FIG. 7, an electronic device may identify one or more peripheral devices to which the stored application data is transmitted by performing step 630 as described above.

According to an embodiment of the present disclosure, the electronic device may transmit a confirmation request signal to the identified peripheral devices in order to identify whether the identified peripheral devices are able to process the application data.

In step 710, the electronic device transmits, to the one or more identified peripheral devices, a request information indicating whether the data of the application in progress in the electronic device can be executed in the one or more identified peripheral devices.

In step 720, the electronic device receives a response to the transmitted request.

In step 730, the electronic device identifies one or more peripheral devices that have transmitted the response.

According to an embodiment of the present disclosure, the electronic device may determine that the one or more peripheral devices that have transmitted the response to the request can process the data of the application in progress in the electronic device.

The electronic device transmits the data of the running application to the one or more identified peripheral devices by performing step 640.

Figure 8:
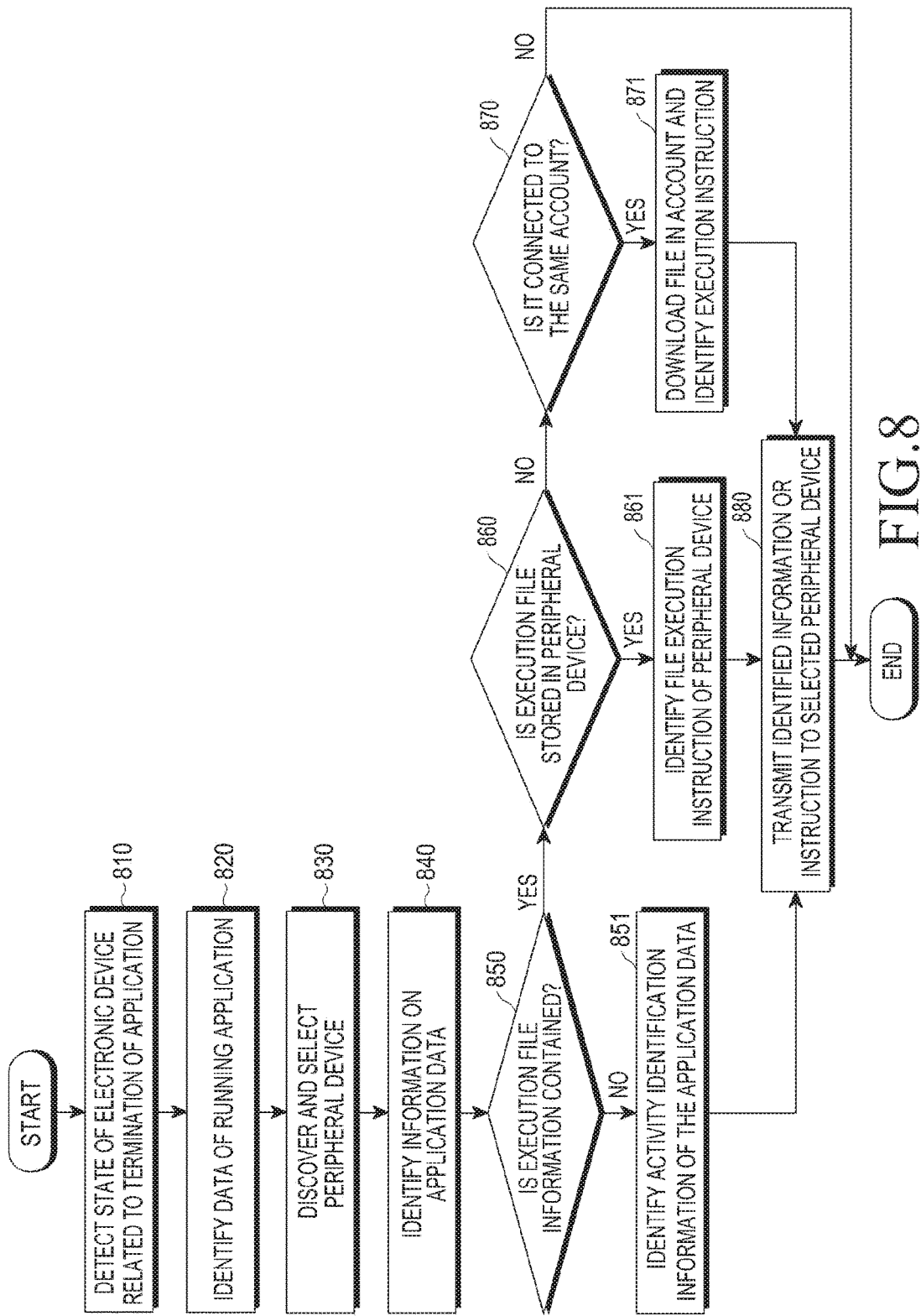
FIG. 8 is a flowchart illustrating a method of controlling execution of an application in an electronic device, according to an embodiment of the present disclosure.

FIG. 8 is a flowchart illustrating a method of controlling execution of an application in an electronic device, according to an embodiment of the present disclosure.

Referring to FIG. 8, in step 810, an electronic device detects a state of the electronic device that satisfies a condition for termination of an application that is in progress in the electronic device.

In step 820, the electronic device backs-up the data of the running application in an account.

In step 830, the electronic device discovers the peripheral devices to which the backed-up data is transmitted, and selects one or more peripheral devices from among the discovered peripheral devices.

In step 840, the electronic device identifies task information regarding the backed-up application data. For example, the task information may contain a variety of information for executing the data of the application, which is in progress at a specific time, in the peripheral device, such as identification information of one or more activities to be called, information indicating whether the application is executed in the background, information indicating whether there is a file to be executed, layout or resolution information for displaying the activities, information on the data that is input into each activity, or access URL information.

The electronic device identifies task information to determine whether the backed up application data contains a file execution task in step 850. For example, the file execution task may contain information used to execute specific files (e.g., media files or documents) in the selected peripheral device according to whether the files to be executed are contained the corresponding data.

If the application data to be transmitted does not contain the file execution task as a result of execution of the step 850 described above, the electronic device identifies identification information of the activity to be called from the stored application data in step 851.

In step 880, the electronic device transmits the identification information of the identified activity to the selected peripheral device.

If the application data to be transmitted contains the file execution task as a result of execution of step 850 described above, the electronic device determines whether the file to be executed is stored in the selected peripheral device in step 860.

If it is determined that the file to be executed is stored in the selected peripheral device as a result of execution of step 860 described above, the electronic device may identify information regarding an instruction to execute the file.

In step 880, the electronic device transmits the identified execution instruction information to the selected peripheral device.

If it is determined that the file to be executed is not stored in the selected peripheral device, as a result of step 860, the electronic device determines whether the selected peripheral device and the electronic device are connected to the same account in step 870.

If it is determined that the selected peripheral device and the electronic device are connected with the same account in step 870 above, the electronic device identifies information that includes instructions to download the file from the connected account and to execute the downloaded file in step 871.

In step 880, the electronic device transmits the identified file download instruction information and execution instruction information for the downloaded file to the selected peripheral device.

Figure 9:
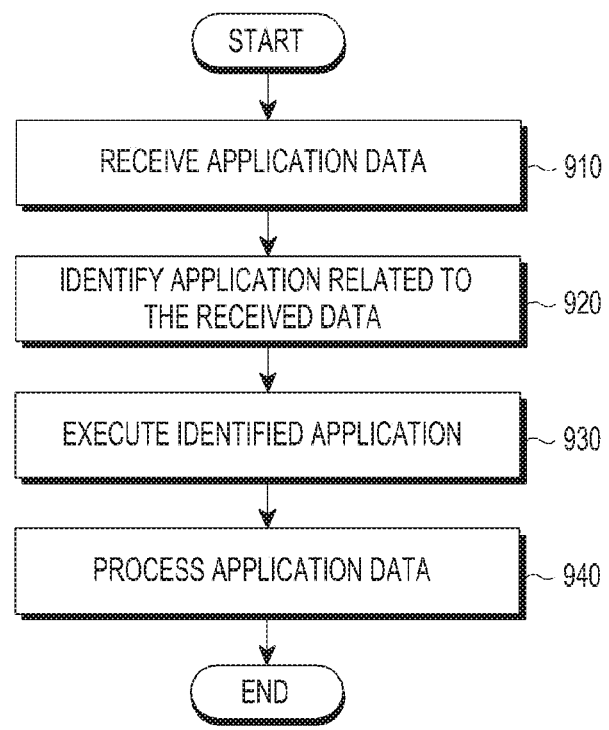
FIG. 9 is a flowchart illustrating a method of controlling execution of an application in a peripheral device, according to an embodiment of the present disclosure.

FIG. 9 is a flowchart illustrating a method of controlling execution of an application in a peripheral device, according to an embodiment of the present disclosure.

Referring to FIG. 9, in step 910, a peripheral device receives application data from an electronic device. For example, the received application data may be transmitted to the electronic device according to the detection of a state of the external electronic device that satisfies a condition for termination of the application in progress in the external electronic device.

In step 920, the peripheral device identifies the information regarding the received application data. For example, the application data may contain a variety of information for executing the application in the electronic device, as well as information regarding a task that is executed at a specific time or identification information of the application that is able to process the corresponding data.

In step 920, the peripheral device identifies the application that is related to the received data. For example, the peripheral device may identify whether an application that is able to process the received data is installed in the peripheral device.

According to an embodiment of the present disclosure, if an application that is able to process the received data is not found in the peripheral device, the electronic device may identify task information of the received data in order to thereby identify whether an application related to the identified task information is installed in the peripheral device. For example, the task information may contain a variety of information for executing the data of an application that in progress at a specific time, in the peripheral device, such as identification information of one or more activities to be called, information indicating whether the application is executed in the background, information indicating whether there is a file to be executed, layout or resolution information for displaying the activities, information on the data that is input into each activity, or access URL information.

In step 930, the peripheral device executes the identified application. For example, the application to be executed may correspond to the task information in the received application data, and may be determined to be an application that is able to process the received data.

In step 940, the peripheral device may process the received application data through the executed application. For example, the peripheral device may process the application data based on the task information contained in the received application data.

According to an embodiment of the present disclosure, the peripheral device may call a specific activity in the executed application, which corresponds to the identification information of the activity. For example, the called activity may be contained in the application in progress in the electronic device at the time when a state of the electronic device that satisfies a condition for termination of the application is detected in the electronic device.

According to an embodiment of the present disclosure, when the peripheral device identifies that there is a file to be executed through the task information, the peripheral device may identify whether a file corresponding to the file information to be executed is stored in the peripheral device. According to the identification result, the electronic device may access a user account of the peripheral device to download the corresponding file or to identify the file stored in the peripheral device, and may process the downloaded or identified file.

According to an embodiment of the present disclosure, even when execution of one or more applications is terminated according to a state of the electronic device that satisfies a condition for termination of the application in progress in the electronic device, the data of the application that has been terminated may be re-processed through one or more peripheral devices that are connected with the electronic device.

Figure 10:
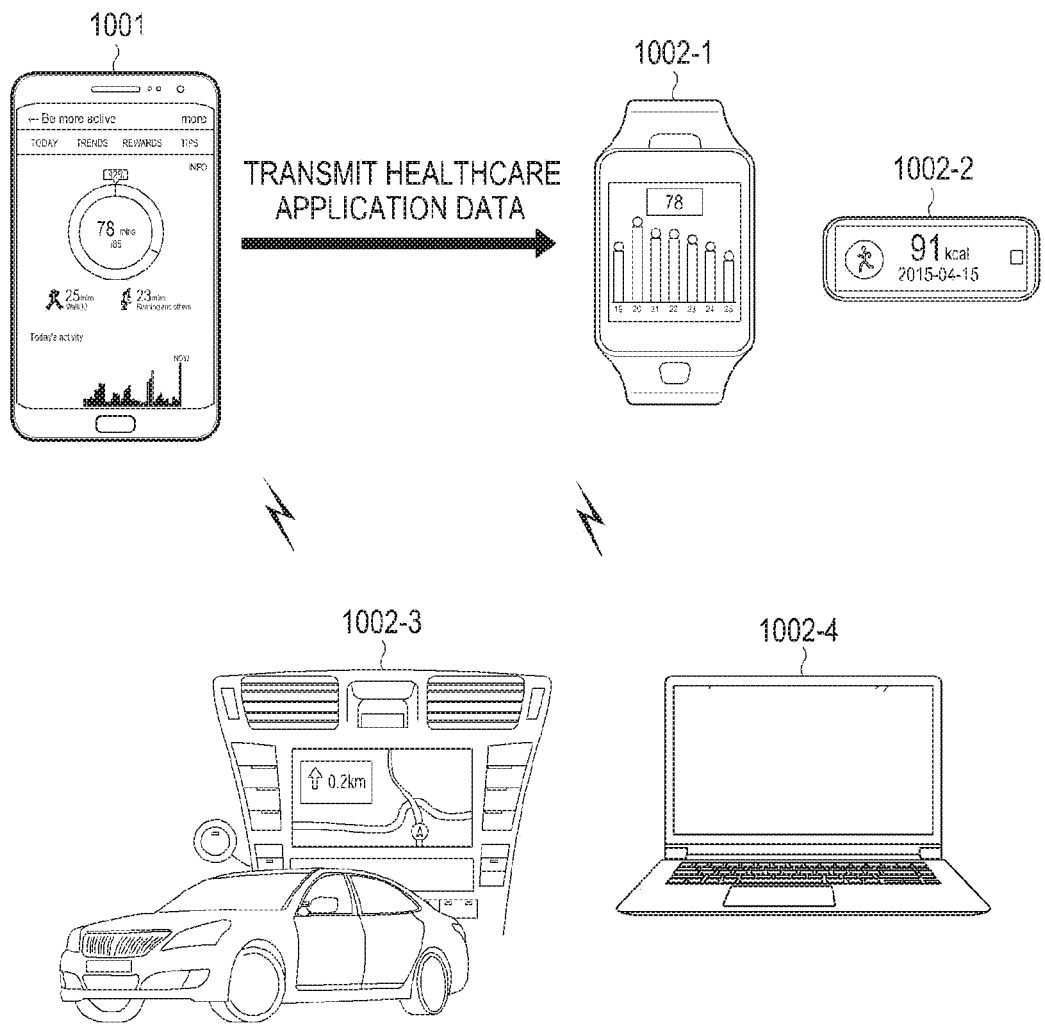
FIG. 10 is a diagram illustrating a method of transferring data of a healthcare application executed in the electronic device to one or more peripheral devices, according to an embodiment of the present disclosure.

FIG. 10 is a diagram illustrating a method of transferring data of a healthcare application executed in the electronic device to one or more peripheral devices, according to an embodiment of the present disclosure.

Referring to FIG. 10, an electronic device 1001 is connected to a plurality of peripheral devices 1002-1, 1002-2, 1002-3, or 1002-4, and a healthcare application is executed so that sensor data detected through one or more sensors may be determined to be motion information of the user. For example, the first peripheral device 1002-1 and the second peripheral device 1002-2 are wearable devices, more specifically a watch and a bracelet, respectively. The third peripheral device 1002-3 is a vehicle that includes a communication module, and the fourth peripheral device 1002-4 may be a laptop computer.

According to an embodiment of the present disclosure, when the electronic device 1001 detects a state of the electronic device 1001 that satisfies a condition for terminating a running healthcare application (e.g., a low battery state), the electronic device 1001 may store data of the running healthcare application, and may transmit the stored data to one or more peripheral devices. For example, the stored data of the healthcare application may contain identification information of an application to be executed, sensor data that was previously input, or information regarding instructions to detect sensor data input.

According to an embodiment of the present disclosure, the electronic device 1001 may select, as a peripheral device to which the data is to be transmitted, an electronic device that has the healthcare application installed therein, or to select an electronic device that has sensors for detecting the user's motion. For example, the electronic device 1001 may select, as the peripheral device to which the data is to be transmitted, at least one of the first peripheral device 1002-1 and the second peripheral device 1002-2, which each include the sensors.

According to an embodiment of the present disclosure, at least one of the first peripheral device 1002-1 and the second peripheral device 1002-2 may receive the data of the healthcare application from the electronic device 1001, and may process the received data. For example, the first peripheral device 1002-1 or the second peripheral device 1002-2 may execute the same or a similar application as the healthcare application, and may perform a method of detecting the user's motion upon execution of the electronic device 1001.

Figure 11:
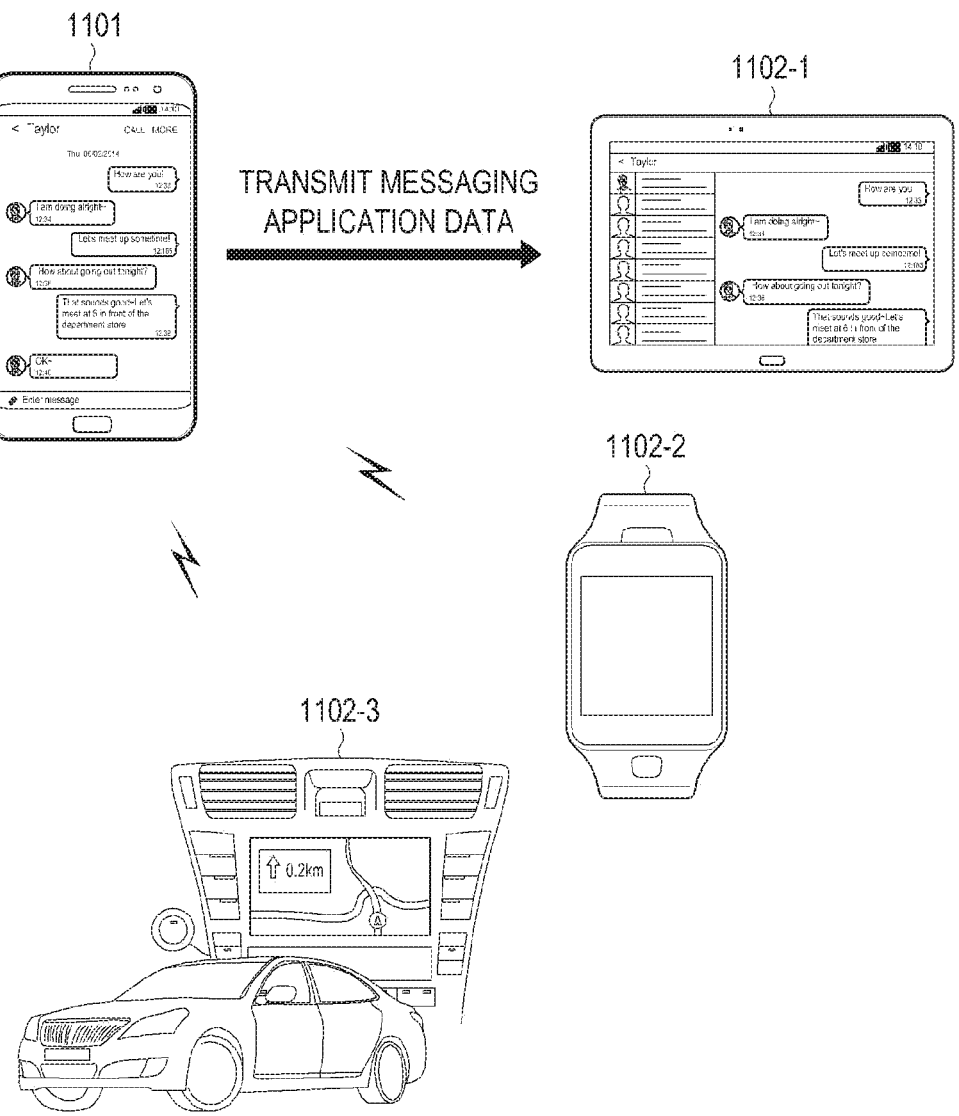
FIG. 11 is a diagram illustrating a method of transferring data of a message replay application executed in an electronic device to one or more peripheral devices, according to an embodiment of the present disclosure.

FIG. 11 is a diagram illustrating a method of transferring data of a message replay application executed in an electronic device to one or more peripheral devices, according to an embodiment of the present disclosure.

Referring to FIG. 11, an electronic device 1101 may be connected with a plurality of peripheral devices 1102-1, 1102-2, and 1102-3, and may execute a messaging application in order to thereby transmit/receive message data to/from other electronic devices. For example, the first peripheral device 1102-1 is a tablet PC, the second peripheral device 1102-2 is a watch, and the third peripheral device 1102-3 is a vehicle that includes a communication module.

According to an embodiment of the present disclosure, when the electronic device 1101 detects a state of the electronic device 1101 that satisfies a condition for terminating execution of a running application (e. g., a low battery state), the electronic device 1101 may store the data of the running messaging application, and may transmit the stored data to at least one of the peripheral devices. For example, the stored data of the messaging application may contain identification information of the application to be executed, message data that was previously transmitted and received, or identification information of an activity to be called.

According to an embodiment of the present disclosure, the electronic device 1101 may select, as a peripheral device to which the data is to be transmitted, an electronic device that has a messaging application installed therein, or an electronic device into which message data can be input. For example, the electronic device 1101 may select, as the peripheral device to which the data is to be transmitted, the first peripheral device 1102-1, which is able to receive an input of message data through a touch input.

According to an embodiment of the present disclosure, the first peripheral device 1102-1 may receive the data of the messaging application from the electronic device 1101, and may process the received data. For example, the first peripheral device 1102-1 may execute the same or similar application as the messaging application running in the electronic device 1101, so that the same/similar application can transmit/receive message data to/from other users, when called upon by the electronic device 1101. The results of running the same/similar application can be output through a display of the first peripheral device 1102-1.

Figure 12:
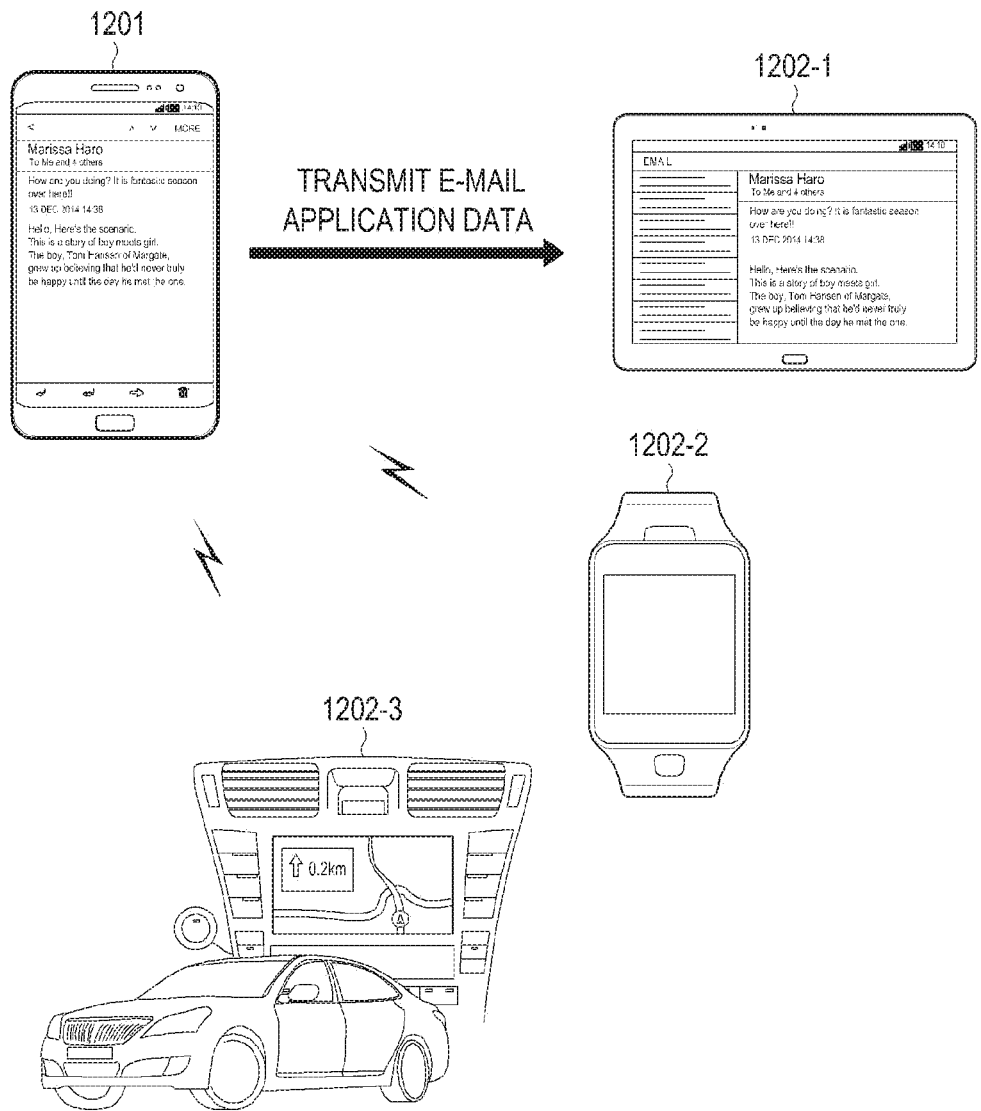
FIG. 12 is a diagram illustrating a method of transferring data of an e-mail application executed in an electronic device to one or more peripheral devices, according to an embodiment of the present disclosure.

FIG. 12 is a diagram illustrating a method of transferring the data of an e-mail application executed in an electronic device to one or more peripheral devices, according to an embodiment of the present disclosure.

Referring to FIG. 12, an electronic device 1201 may be connected with a plurality of peripheral devices 1202-1, 1202-2, or 1202-3, and may execute an e-mail application in order to thereby transmit/receive e-mails to/from other electronic devices. For example, the first peripheral device 1202-1, the second peripheral device 1202-2, and the third peripheral device 1202-3 may be a tablet PC, a watch, and a vehicle including a communication module, respectively.

According to an embodiment of the present disclosure, when the electronic device 1201 detects a state of the electronic device 1201 that satisfies a condition for terminating the running e-mail application (e.g., a low battery state), the electronic device 1201 may store the data of the running e-mail application, and may transmit the stored data to one or more of the peripheral devices 1202-1, 1202-2, and 1202-3. For example, the stored data of the e-mail application may contain identification information of the application to be executed, e-mail data that has been previously transmitted and received, and/or identification information of an activity to be called.

According to an embodiment of the present disclosure, the electronic device 1201 may select, as a peripheral device to which the data is to be transmitted, an electronic device that has the e-mail application installed therein or an electronic device into which the e-mail data can be input. For example, the electronic device 1201 may select, as the peripheral device to which the data is to be transmitted, the first peripheral device 1202-1 or the second peripheral device 1202-2, which is able to receive an input of the e-mail data through a touch input or is able to receive input for writing e-mail data via a keyboard.

According to an embodiment of the present disclosure, if there is file information to be attached to the e-mail data through the task information of the data, the electronic device 1201 may select a peripheral device that stores the corresponding file or is able to attach the corresponding file to the e-mail data among the selected peripheral devices. For example, the files to be attached to the e-mail may include documents, images, media files, execution files, etc.

According to an embodiment of the present disclosure, the electronic device 1201 may transmit the stored data of the e-mail application to the first peripheral device 1202-1, and the first peripheral device 1202-1 may receive the data of the e-mail application from the electronic device 1201 in order to thereby process the received data. For example, the first peripheral device 1202-1 may execute the same application as the e-mail application running in the electronic device 1201, or may execute an application that is able to transmit/receive the e-mail data, such that the first peripheral device 1202-1 writes e-mail based on the attached files corresponding to a specific user of the electronic device 1201. The results of executing the e-mail application in the first peripheral device 1202-1 can be output through a display of the first peripheral device 1202-1.

Figure 13:
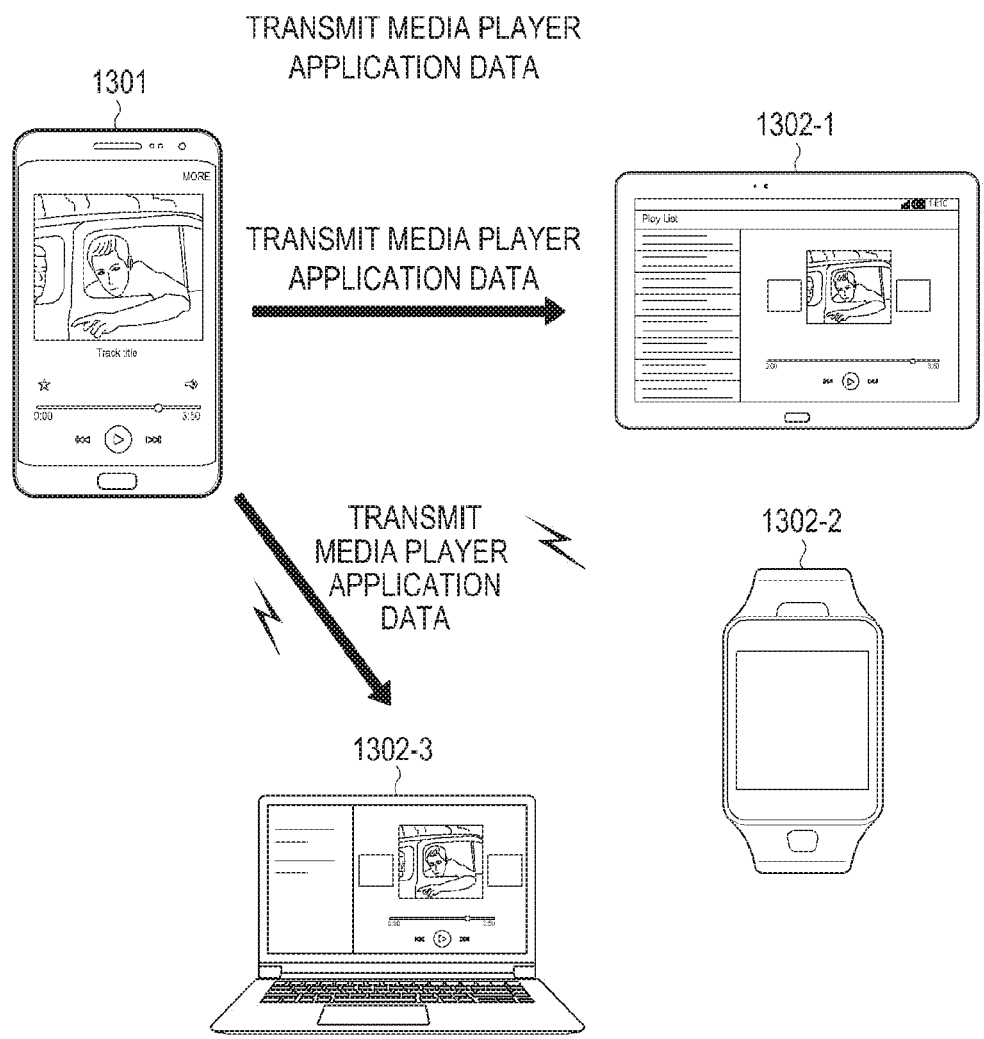
FIG. 13 is a diagram illustrating a method of transferring data of a media player application executed in an electronic device to one or more peripheral devices, according to an embodiment of the present disclosure.

FIG. 13 is a diagram illustrating a method of transferring data of a media player application executed in an electronic device to one or more peripheral devices, according to an embodiment of the present disclosure.

Referring to FIG. 13, an electronic device 1301 may connect to a plurality of peripheral devices 1302-1, 1302-2, or 1302-3. The electronic device 1301 may also execute a media player application to thereby reproduce media files. The media files may include music files, video files, or a replay list that contains the one or more media files. For example, the first peripheral device 1302-1, the second peripheral device 1302-2, and the third peripheral device 1302-3 are a tablet PC, a watch, and a laptop computer, respectively.

According to an embodiment of the present disclosure, when the electronic device 1301 detects a state of the electronic device 1301 that satisfies a condition for terminating the running media player application (e. g., a low battery state), the electronic device 1301 may store the data of the running media player application, and may transmit the stored data to one or more of the peripheral devices 1302-1 through 1302-3. For example, the stored data of the media player application may contain identification information of an application to be executed, information on the media files that are in play, information indicating a section of a media file that has most recently been reproduced, or identification related to the play list.

According to an embodiment of the present disclosure, the electronic device 1301 may select, as a peripheral device to which the data is to be transmitted, an electronic device that has an application for reproducing media files installed therein or an electronic device that stores media files. For example, the electronic device 1301 may select, as the peripheral device to which the data is to be transmitted, the first peripheral device 1302-1, the second peripheral device 1302-2, or the third peripheral device 1302-3, which each include media files and an application that is able to reproduce the media files.

According to an embodiment of the present disclosure, the electronic device 1301 may select, as the peripheral device to which the data is to be transmitted, the second peripheral device 1302-2, which has a relatively higher battery capacity, or the third peripheral device 1302-3 which is connected to an external power source. The selection may be performed based on considering that the reproduction of media files requires a relatively high level of power consumption.

According to an embodiment of the present disclosure, the electronic device 1301 may transmit the stored data of the media player application to the second peripheral device 1302-2 or the third peripheral device 1302-3, and the user may select one of the second peripheral device 1302-2 or the third peripheral device 1302-3. For example, the peripheral device selected by the user may receive the data of the media player application from the electronic device 1301 in order to thereby reproduce the media file.

Figure 14:
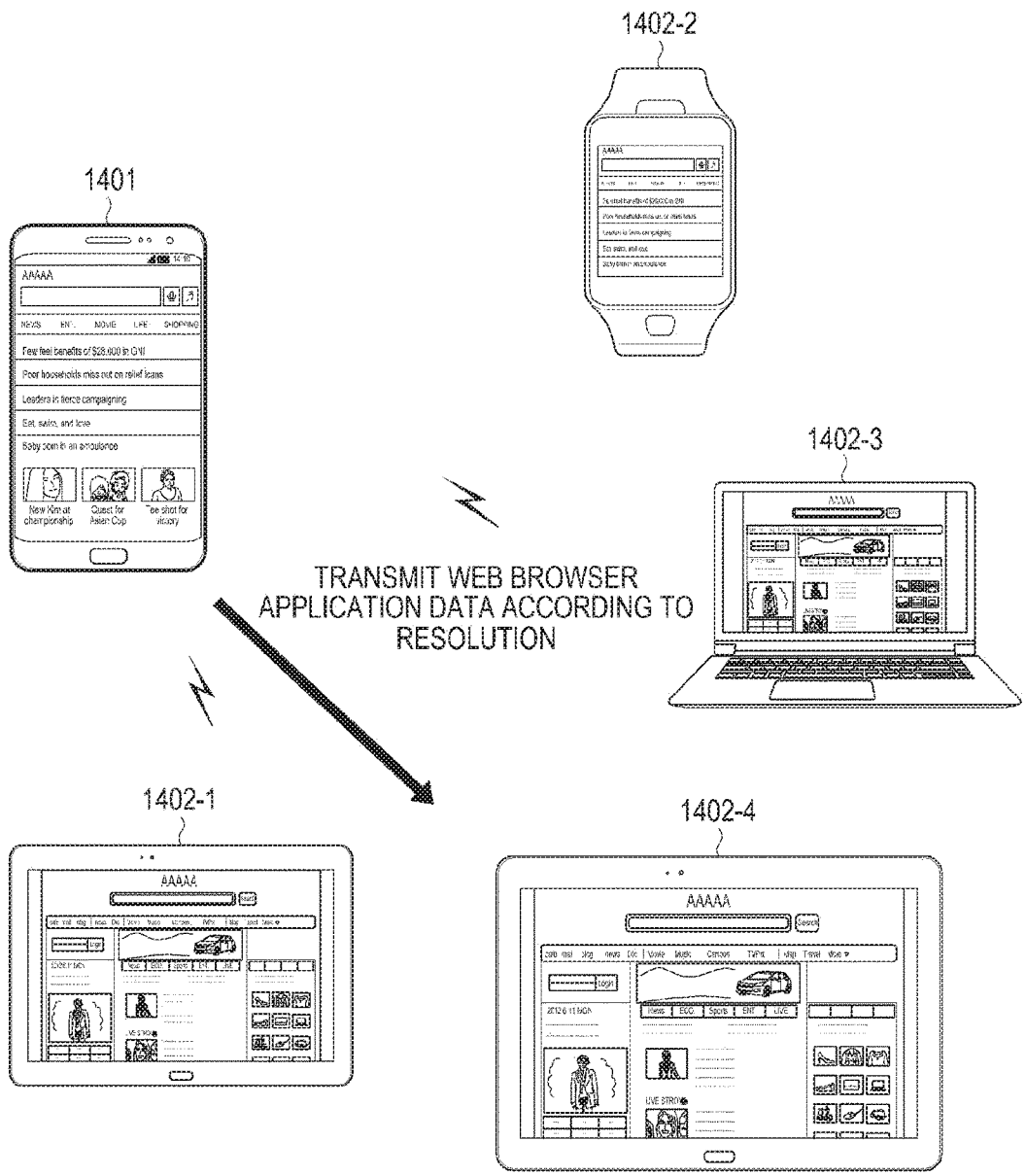
FIG. 14 is a diagram illustrating a method of transferring data of a web browser application executed in an electronic device to one or more peripheral devices, according to an embodiment of the present disclosure.

FIG. 14 is a diagram illustrating a method of transferring the data of a web browser application executed in an electronic device to one or more peripheral devices, according to an embodiment of the present disclosure.

Referring to FIG. 14, an electronic device 1401 may be connected with a plurality of peripheral devices 1402-1, 1402-2, 1402-3, and 1402-4, and may execute a web browser application to thereby browse one or more web pages. For example, the first peripheral device 1402-1 and the second peripheral device 1402-2 are a tablet PC and a watch, respectively. The third peripheral device 1402-3 and the fourth peripheral device 1402-4 are a laptop computer and a tablet PC, respectively, which each includes a larger display than the first peripheral device 1402-1.

According to an embodiment of the present disclosure, when the electronic device 1401 detects a state of the electronic device 1401 that satisfies a condition for terminating the running web browser application (e. g., a low battery state), the electronic device 1401 may store the data of the web pages displayed by the web browser application in progress, and may transmit the stored data to one or more peripheral devices. For example, the stored data of the web browser application may contain identification information of the application to be executed, URL information of the web pages, text or media data information contained in the web pages, layout or resolution information of the web browser application, etc.

According to an embodiment of the present disclosure, the electronic device 1401 may select, as a peripheral device to which the data is to be transmitted, an electronic device that has the web browser application installed therein or an electronic device that is able to display web pages. For example, the electronic device 1401 may select, as the peripheral device to display web pages, the first peripheral device 1402-1, the second peripheral device 1402-2, the third peripheral device 1402-3, or the fourth peripheral device 1402-4.

According to an embodiment of the present disclosure, the electronic device 1401 may select the fourth peripheral device 1402-4, which has a display of a relatively high resolution, among the peripheral devices 1402-1 through 1402-4, in order to clearly and largely display the text or media data of the web pages.

According to an embodiment of the present disclosure, the electronic device 1401 may transmit the stored data of the web browser application to the fourth peripheral device 1402-4, and the fourth peripheral device 1402-4 may receive the data of the web browser application from the electronic device 1401 in order to thereby access a specific URL and in order to thereby display the web page. For example, the first peripheral device 1402-1 may execute an application capable of displaying a web page, and may display a web page corresponding to a web page that has been displayed at the time of the termination of the web browser application in the electronic device 1401.

Figure 15:
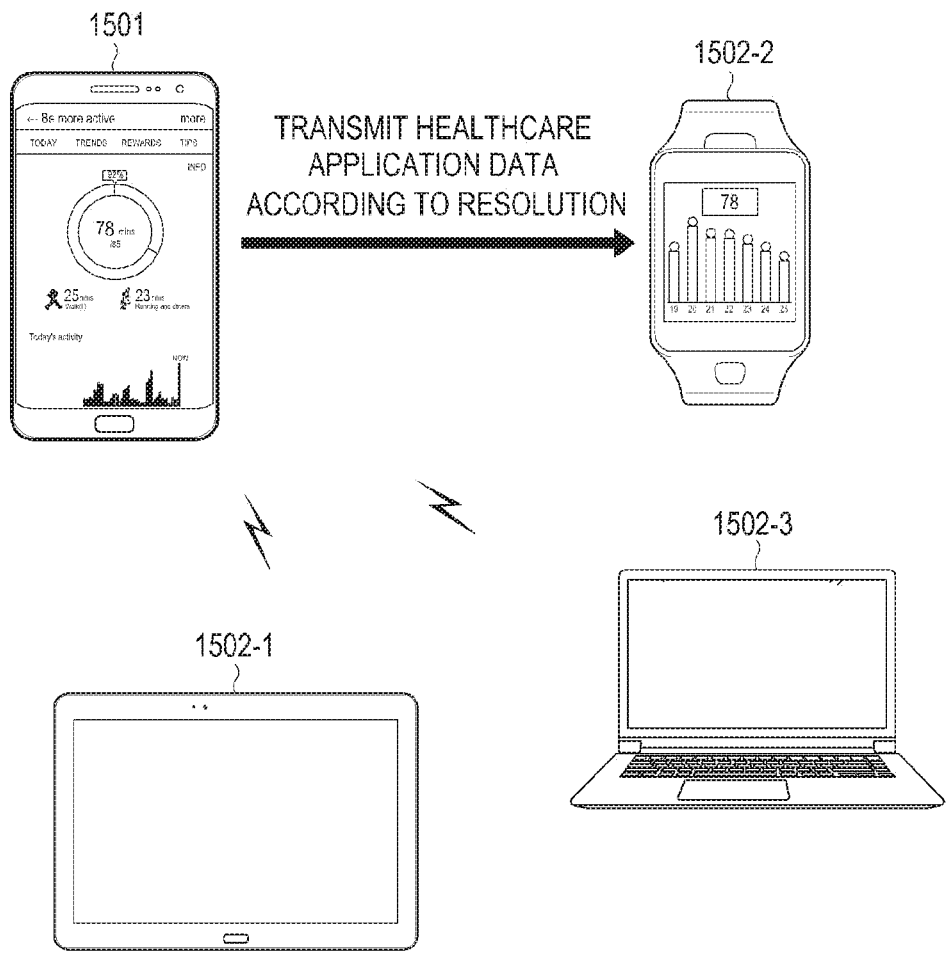
FIG. 15 is a diagram illustrating a method of transferring data of an application executed in the electronic device to one or more peripheral devices, according to an embodiment of the present disclosure.

FIG. 15 is a diagram illustrating a method of transferring data of an application executed in an electronic device to one or more peripheral devices, according to an embodiment of the present disclosure.

Referring to FIG. 15, an electronic device 1501 may be connected with a plurality of peripheral devices e.g., 1502-1, 1502-2, or 1502-3, and may execute a healthcare application to thereby sense a user's motion. For example, the first peripheral device 1502-1 and the second peripheral device 1502-2 may be a tablet PC and a watch, respectively. The third peripheral device 1502-3 may be a laptop computer.

According to an embodiment of the present disclosure, when the electronic device 1501 detects a state of the electronic device 1501 that satisfies a condition for termination the running healthcare application (e. g., a low battery state), the electronic device 1501 may store the data of the running healthcare application, and may transmit the stored data to one or more of the peripheral devices 1502-1 through 1502-3. For example, the stored data of the healthcare application may contain identification information of the application to be executed, information regarding execution in the background, identification information of an activity, sensor information, sensor data that has been previously stored, etc.

According to an embodiment of the present disclosure, the electronic device 1501 may select, as a peripheral device to which the data is to be transmitted, a device that includes sensors for sensing the user's motion. For example, the electronic device 1501 may select, as the peripheral device for sensing the user's motion, the first peripheral device 1502-1, the second peripheral device 1502-2, or the third peripheral device 1502-3.

According to an embodiment of the present disclosure, since the sensor data is to be detected periodically when the healthcare application is executed in the background, the electronic device 1501 may select, as the peripheral device to which the data is to be transmitted, a device that includes sensors for sensing the user's motion and has low power consumption. For example, a wearable device (e.g., the second peripheral device 1502-2) may be selected from among the identified peripheral devices according to these conditions.

According to an embodiment of the present disclosure, the electronic device 1501 may transmit the stored data of the healthcare application to the second peripheral device 1502-4. For example, when the second peripheral device 1502-2 receives the data of the healthcare application from the electronic device 1501, the second peripheral device 1502-2 may activate sensors for sensing the user's motion in order to thereby detect an input of the sensor data, and may identify information on the previous user's motion among the received data to thereby store the data detected by the second peripheral device 1502-2 in addition to the identified information.

Figure 16:
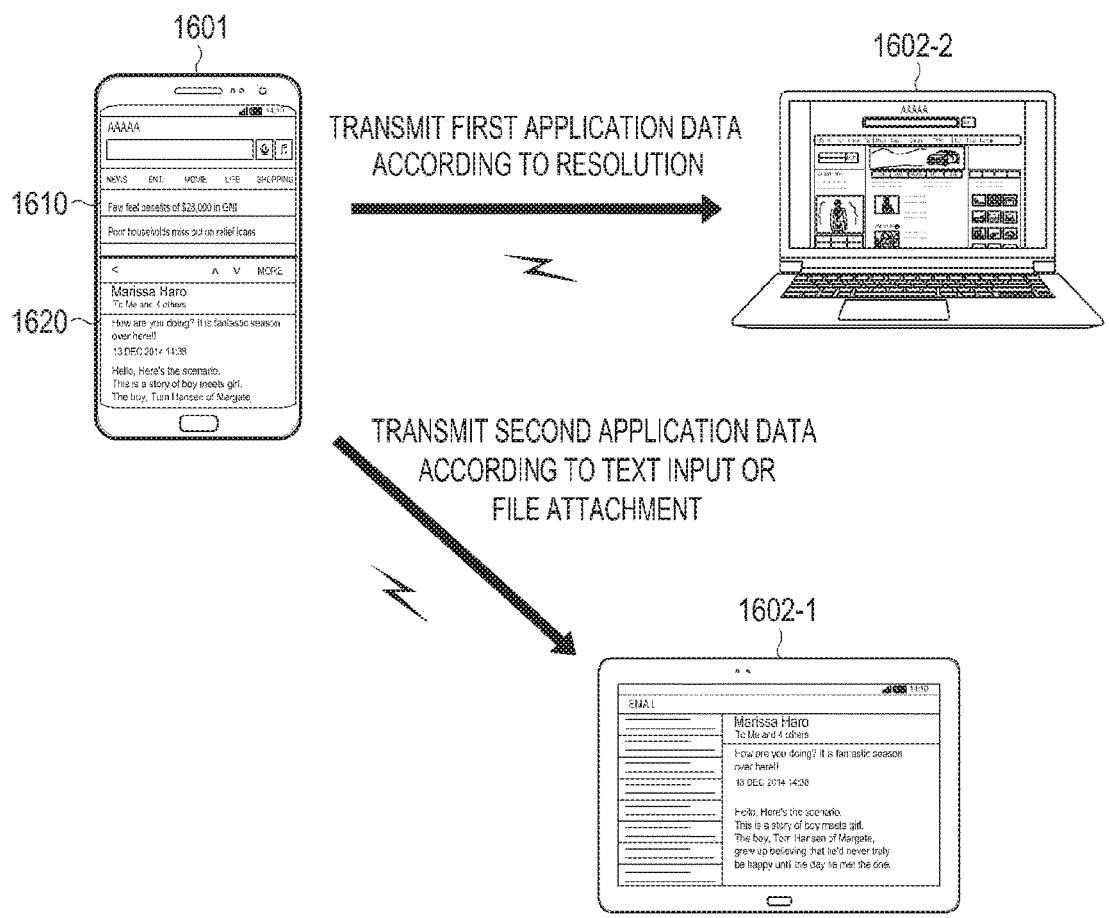
FIG. 16 is a diagram illustrating a method of transferring data of a plurality of applications executed in an electronic device to one or more peripheral devices, according to an embodiment of the present disclosure.

FIG. 16 is a diagram illustrating a method of transferring data of a plurality of applications executed in an electronic device to one or more peripheral devices, according to an embodiment of the present disclosure.

Referring to FIG. 16, the electronic device 1601 may be connected with a plurality peripheral devices 1602-1 and 1602-2, and may output a plurality of applications including a web browser application 1610 and an e-mail application 1620 through a single screen. The first peripheral device 1602-1 and the second peripheral device 1602-2 are a tablet PC and a laptop computer, respectively.

According to an embodiment of the present disclosure, when the electronic device 1601 detects the state of the electronic device 1601 in relation to the termination of the running applications (e. g., a battery state), the electronic device 1601 may store the data of the plurality of applications in progress, and may transmit the stored data to one or more peripheral devices. For example, the data of the web browser application 1610 may contain identification information of the application to be executed, URL information of the web pages, text or media data information contained in the web pages, layout or resolution information of an activity in progress, etc. The data of the e-mail application 1620 may contain identification information of the application to be executed, e-mail data that has been previously transmitted and received, or identification information of an activity that is in progress at the end time.

According to an embodiment of the present disclosure, the electronic device 1601 may select a peripheral device to which the data is to be transmitted for each of the plurality of applications. For example, the electronic device 1601 may select, as the peripheral device to which the data of the web browser application 1610 is to be transmitted, the second peripheral device 1602-2, and may select, as the peripheral device to which the data of the e-mail application 1620 is to be transmitted, the first peripheral device 1602-1, which enables text input or file attachment.

According to an embodiment of the present disclosure, the electronic device 1601 may transmit both the data of the web browser application 1610 and the data of the e-mail application 1620 to the second peripheral device 1602-2, according to a battery state of the first peripheral 1602-1.

According to an embodiment of the present disclosure, the electronic device 1601 may transmit the stored data of the web browser application 1610 and the email application 1620 to the first peripheral device 1602-1 or the second peripheral device 1602-2. For example, even when the running applications are terminated according to a state of the electronic device 1601 that satisfies a condition for termination of the application in progress in the electronic device 1601, the user of the electronic device 1601 may process the data of the web browser application 1610 and the e-mail application 1620 in the same screen, at the time of the termination, through the first peripheral device 1602-1 or the second peripheral device 1602-2.

Figure 17:
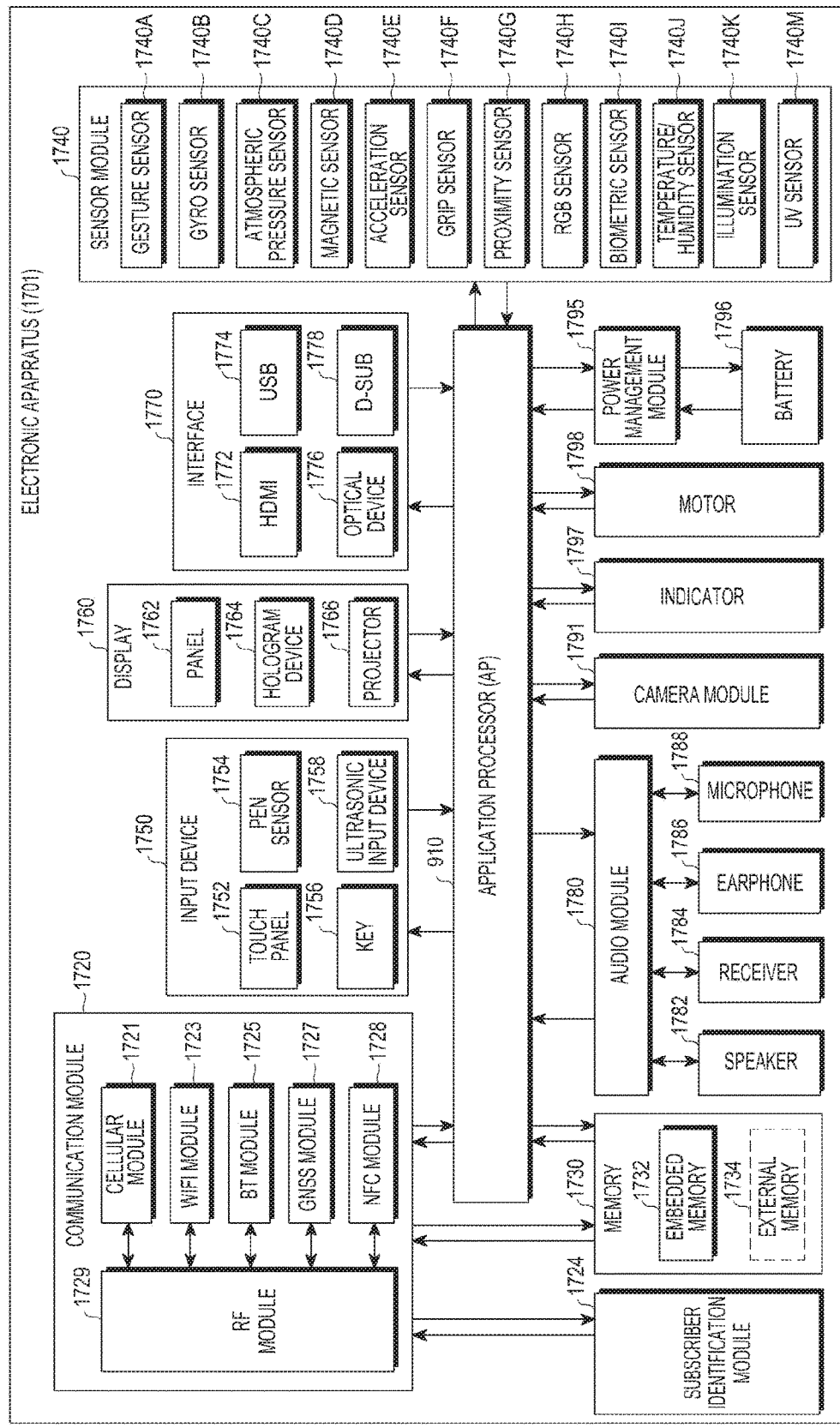
FIG. 17 is a block diagram illustrating a configuration of an electronic device, according to an embodiment of the present disclosure.

FIG. 17 is a block diagram illustrating a configuration of an electronic device, according to an embodiment of the present disclosure.

Referring to FIG. 17, the electronic device 1701 includes at least one application processor (AP) 1710, a communication module 1720, a subscriber identification module 1724, a memory 1730, a sensor module 1740, an input device 1750, a display 1760, an interface 1770, an audio module 1780, a camera module 1791, a power management module 1795, a battery 1796, an indicator 1797, and a motor 1798.

The processor 1710 may control a multitude of hardware or software elements connected with the processor 1710, and may perform processing of various pieces of data and a calculation, by executing an operating system and/or application programs. The processor 1710 may be implemented by, for example, a system on chip (SoC). According to an embodiment of the present disclosure, the processor 1710 may further include a graphic processing unit (GPU) and/or an image signal processor. The processor 1710 may include at least some of the elements shown in FIG. 3. The processor 1710 may load instructions or data received from one or more other elements (e.g., a non-volatile memory) to a volatile memory to then process the same, and may store a variety of data in a non-volatile memory.

According to an embodiment of the present disclosure, the processor 1710 detects a state of the electronic device 1701 that satisfies a condition for termination of an application, while the application is executed in the electronic device 1701, the processor 1710 may control to transmit the data of the running application so that the data of the running application may be processed in an external electronic device.

The communication module 1720 may have the same or similar configuration as the configuration of the communication interface 270 of FIG. 2 or the communication unit 320 of FIG. 3. The communication module 1720 includes a cellular module 1721, a WiFi module 1723, a Bluetooth module 1725, a GNSS module 1727 (e.g., a GPS module, a Glonass module, a Beidou module, or a Galileo module), an NFC module 1728, and a radio frequency (RF) module 1729.

The cellular module 1721, for example, may provide services of voice calls, video calls, text messaging, or the Internet through communication networks. For example, the cellular module 1721 may perform identification and authentication of the electronic device 1701 in communication networks by using the subscriber identification module (SIM) card 1724. According to an embodiment of the present disclosure, the cellular module 1721 may perform at least some of the functions provided by the processor 1710. The cellular module 1721 may include a communication processor (CP).

Each of the WiFi module 1723, the Bluetooth module 1725, the GNSS module 1727, or the NFC module 1728 may include a processor for processing data transmitted and received through the corresponding module. According to an embodiment of the present disclosure, two or more of the cellular module 1721, the WiFi module 1723, the Bluetooth module 1725, the GNSS module 1727, or the NFC module 1728 may be included in one integrated chip (IC) or one IC package.

The RF module 1729 may transmit and receive data, for example, RF signals. The RF module 1729 may include, for example, a transceiver, a power amp module (PAM), a frequency filter, a low noise amplifier (LNA), antennas, etc. According to another embodiment of the present disclosure, at least one of the cellular module 1721, the WiFi module 1723, the Bluetooth module 1725, the GNSS module 1727 and the NFC module 1728 may transmit and receive RF signals through separated modules.

The subscriber identification module 1724 may include a card adopting a subscriber identification module and/or an embedded SIM, and may include inherent identification information (e.g., an integrated circuit card identifier (IC-CID)) or subscriber information (e.g., an international mobile subscriber identity (IMSI)).

The memory 1730 (e.g., the memory 230 or the memory 340) may include an internal memory 1732 or an external memory 1734.

The memory 1730, according to an embodiment of the present disclosure, may store instructions that allow the processor 1710 to discover external electronic devices when a state of the electronic device that satisfies a condition for termination of a running application is detected while the application is in progress; and transmit the data of the running application to one or more electronic devices that are selected from the discovered external electronic devices through the communication unit so that the data of the running application is processed by the one or more selected electronic devices.

The memory 1730, according to an embodiment of the present disclosure, may store instructions that allow the processor 1710 to determine at least one of a remaining amount of a battery, a temperature-related state, or the mounting state of an accessory of the electronic device, as the state of the electronic device; and terminate at least one of the running applications according to the determined state of the electronic device.

The memory 1730, according to an embodiment of the present disclosure, may store instructions that allow the processor 1710 to select one or more external electronic devices to which the data of the running application is to be transmitted according to information that is contained in the data of the running application. For example, the information contained in the data of the running application may include at least one of information indicating whether the application is executed in the background, execution file information, input data information, information on an activity to be called, or access URL information, for each piece of the stored data.

The memory 1730, according to an embodiment of the present disclosure, may store instructions that allow the processor 1710 to select, as the electronic device to which the data of the running application is to be transmitted, the first electronic device that stores a file corresponding to the execution file information from among the one or more external electronic devices, if the electronic device determines that the execution file information is contained in the data of the running application.

The memory 1730, according to an embodiment of the present disclosure, may store instructions that allow the processor 1710 to transmit, to the second electronic device, which is connected through an account of the electronic device, from among the one or more external electronic devices, information that instructs the second electronic device to download the file through the account of the electronic device and to execute the same, if the first electronic device is not identified.

The memory 1730, according to an embodiment of the present disclosure, may store instructions that allow the processor 1710 to select, as the electronic device to which the data of the running application is to be transmitted, the third electronic device, which has the lowest power consumption for processing the data of the running application, from among the one or more external electronic devices, if the controller identifies information contained in the data of the running application and determines that the application was in progress in the background.

The memory 1730, according to an embodiment of the present disclosure, may store instructions that allow the processor 1710 to identify the application that has been terminated according to the mounting state of an accessory; and select, as the electronic device to which the data of the running application is to be transmitted, the fourth electronic device that is able to output the data, which is processed through the accessory that is mounted on, or detached from, the electronic device.

The memory 1730, according to an embodiment of the present disclosure, may store instructions that allow the processor 1710 to broadcast a signal requesting information indicating whether the data of the running application is able to be processed; and select, as the electronic device to which the data of the running application is to be transmitted, the fifth electronic device that responds to the signal.

The memory 1730, according to an embodiment of the present disclosure, may store instructions that allow the processor 1710 to execute an application that is related to the received data of the application when data of an application is received from an external electronic device; and process the received data of the application through the executed application, wherein the received data of the application may be the data of an application that is in progress in the external electronic device and is transmitted according to the state of the external electronic device.

The memory 1730, according to an embodiment of the present disclosure, may store instructions that allow the processor 1710 to: display a message that requires to confirm whether the data of the application received from the external electronic device is to be executed through the display unit 1760; and determine whether the data of the application received from the external electronic device is to be executed when a response to the message is received.

The memory 1730, according to an embodiment of the present disclosure, may store instructions that, if a signal that asks whether data of the first application is able to be executed, which is broadcast from the first electronic device, is identified, allow the processor 1710 to identify whether an application capable of processing the data of the first application is installed in the electronic device; and transmit a response to the broadcast signal to the first electronic device.

The internal memory 1732, for example, may include at least one of volatile memories (e.g., a dynamic RAM (DRAM), a static RAM (SRAM), a synchronous dynamic RAM (SDRAM), etc.) or non-volatile Memories (e.g., an one time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash), a hard drive, a solid state drive (SSD), etc.).

The external memory 1734 may further include a flash drive, for example, a compact flash (CF), a secure digital (SD), a micro secure digital (Micro-SD), a mini secure digital (Mini-SD), an extreme digital (xD), a memory stick, etc. The external memory 1734 may be functionally and/or physically connected with the electronic device 1701 through various interfaces.

The sensor module 1740, for example, may measure physical quantities and may detect the operation state of the electronic device 1701 to thereby convert the measured or detected information to electric signals. The sensor module 1740 includes, for example, a gesture sensor 1740A, a gyro-sensor 1740B, an atmospheric sensor 1740C, a magnetic sensor 1740D, an acceleration sensor 1740E, a grip sensor 1740F, a proximity sensor 1740G, a color sensor 1740H (e.g., a red-green-blue (RGB) sensor), a biometric sensor 1740I, a temperature/humidity sensor 1740J, an illuminance sensor 1740K, or an ultra violet (UV) sensor 1740M. Alternatively or additionally, the sensor module 1740 may further include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1740 may further include a control circuit for controlling one or more sensors included therein. According to an embodiment of the present disclosure, the electronic device 1701 may further include a processor, as a part of the processor 1710 or separately from the processor 1710, which is configured to control the sensor module 1740 in order to thereby control the processor 1710 while the processor 1710 is in a sleep mode.

The input device 1750, for example, may include a touch panel 1752, a (digital) pen sensor 1754, keys 1756, or an ultrasonic input device 1758. The touch panel 1752 may use at least one of, for example, a capacitive type, a pressure type, an infrared type, or an ultrasonic type. In addition, the touch panel 1752 may further include a control circuit. The touch panel 1752 may further include a tactile layer in order to thereby provide a user with a tactile reaction.

For example, the (digital) pen sensor 1754 may be a part of the touch panel, or may include a separate recognition sheet. The keys 1756 may include, for example, physical buttons, optical keys, or a keypad. The ultrasonic input device 1758 detects acoustic waves generated in input means through a microphone 1788 to thereby identify data corresponding to the acoustic waves.

The display 1760 includes a panel 1762, a hologram device 1764, or a projector 1766. The panel 1762 may include the same or similar elements as the display 260 or the display unit 330. The panel 1762 may be flexible, transparent, or wearable. The panel 1762 may be configured with the touch panel 1752 as a single module. The hologram device 1764 may display 3D images in the air by using interference of light. The projector 1766 may display images by projecting light onto a screen. The screen may be positioned, for example, inside or outside the electronic device 1701. According to an embodiment, the display 1760 may further include a control circuit for controlling the panel 1762, the hologram device 1764, or the projector 1766.

The interface 1770 includes, for example, a high-definition multimedia interface (HDMI) 1772, a universal serial bus (USB) interface 1774, an optical interface 1776, and a D-subminiature (D-sub) 1778. The interface 1770 may be included in, for example, the communication interface 270 shown in FIG. 2. Additionally or alternatively, the interface 1770 may include, for example, a mobile high-definition link (MHL) interface, a secure digital (SD) card/multi-media card (MMC) interface or an infrared data association (IrDA) standard interface.

The audio module 1780 may convert a sound into an electrical signal, and vice versa. At least some elements of the audio module 1780 may be included, for example, in the input/output interface 250 shown in FIG. 2. For example, the audio module 1780 may process voice information input or output through a speaker 1782, a receiver 1784, earphones 1786, or the microphone 1788.

According to an embodiment of the present disclosure, when the electronic device 1701 detects that one or more elements included in the audio module 1780 are removed, the electronic device 1701 may end execution of the application that processes data through the one or more removed elements, and may select, as a peripheral device to which the data of the ended application is to be transmitted, an electronic device that is similar to the one or more removed elements.

The camera module 1791 is a device for photographing still and moving images, and, according to an embodiment, the camera module 1791 may include one or more image sensors (e.g., a front sensor or a rear sensor), lenses, an image signal processor (ISP), or a flash (e.g., an LED or a xenon lamp).

The power management module 1795 may manage the power of the electronic device 1701. According to an embodiment of the present disclosure, the power management module 1795 may include a power management integrated circuit (PMIC), a charger integrated circuit (IC), or a battery gauge. The PMIC may be implemented by a wired charging type and a wireless charging type. The wireless charging type may encompass, for example, a magnetic resonance type, a magnetic induction type, or an electromagnetic wave type, and additional circuits for wireless charging, such as coil loops, resonance circuits, or rectifiers, may be provided. The battery gauge may measure, for example, the remaining power of the battery 1796, a charging voltage and current, or temperature. The battery 1796 may include, for example, a rechargeable battery or a solar battery.

According to an embodiment of the present disclosure, an application in progress in the electronic device 1701 may be terminated according to the remaining amount of the battery 1796. The electronic device 1701 may discover one or more electronic devices to which the data of the terminated application is to be transmitted, and may transmit the data of the terminated application to at least one of the discovered electronic devices.

The indicator 1797 may display a specific state, for example, a booting state, a message state or a charging state of at least a part (e.g., the processor 1710) of the electronic device 1701. The motor 1798 may convert an electric signal to a mechanical vibration, and may provide a vibration or a haptic effect. The electronic device 1701 may include a processing device (e.g., a GPU) for supporting mobile TV. The processing device for supporting mobile TV may process media data according to standards, such as, for example, digital multimedia broadcasting (DMB), digital video broadcasting (DVB), or media flow.

Each of the above-described component elements of hardware according to the present disclosure may be configured with one or more components, and the names of the corresponding component elements may vary based on the type of electronic device. An electronic device according to embodiments of the present disclosure may include at least one of the above-described elements. Some of the above-described elements may be omitted from an electronic device, or an electronic device may further include additional elements. Some of the hardware components according to an embodiment may be combined into a single entity that performs functions identical to those of the relevant components before the combination.

Figure 18:
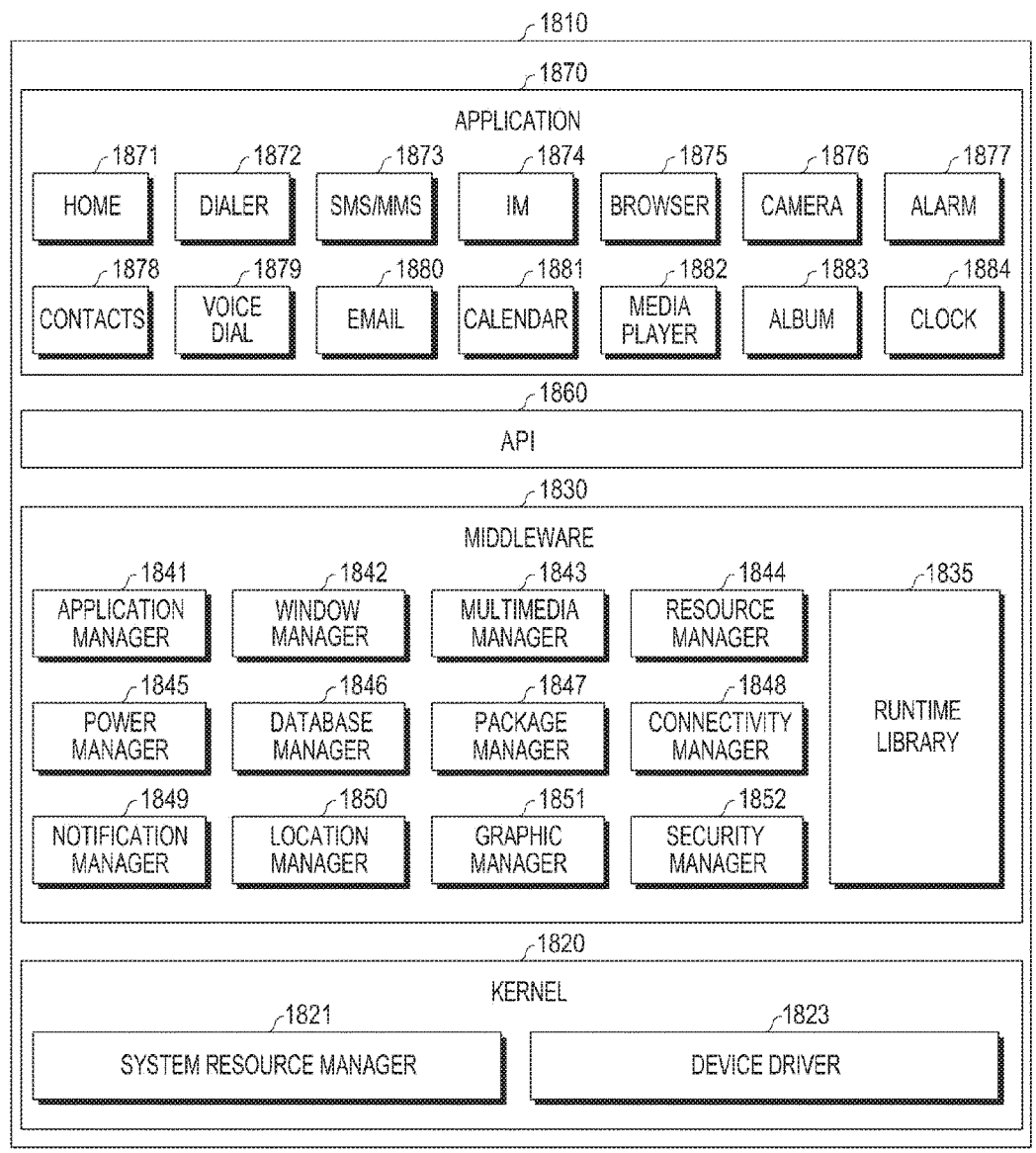
FIG. 18 is a block diagram illustrating a program module, according to an embodiment of the present disclosure.

FIG. 18 is a block diagram illustrating a program module, according to an embodiment of the present disclosure.

According to an embodiment of the present disclosure, the programming module 1810 (e.g., the program 240) may include an operating system (OS) for controlling the electronic device (e.g., the electronic device 201) or resources related to the electronic device 300 and/or various applications (e.g., the application programs 247), which are operated under the operating system. For example, the operating system may be Android, iOS, Windows, Symbian, Tizen, Bada, etc.

Referring to FIG. 18, the programming module 1810 includes a kernel 1820, middleware 1830, an application programming interface (API) 1860, and applications 1870. At least some of the program module 1810 may be preloaded in the electronic device, or may be downloaded from the first peripheral electronic device 202, the second peripheral electronic device 204, or the server 206.

The kernel 1820 (e.g., the kernel 241), for example, may include a system resource manager 1821 or a device driver 1823. The system resource manager 1821 may include, for example, a process management unit, a memory management unit, or a file system management unit. The device driver 1823 may include, for example, a display driver, a camera driver, a Bluetooth driver, a common memory driver, a USB driver, a keypad driver, a Wi-Fi driver, an audio driver, or an inter-process communication (IPC) driver.

The middleware 1830, for example, may provide functions required in common for the applications 1870, or may provide various functions through the API 1860 in order to allow the applications 1870 to effectively use limited system resources in the electronic device. According to an embodiment of the present disclosure, the middleware 1830 (e.g., the middleware 173) includes a run time library 1835, an application manager 1841, a window manager 1842, a multimedia manager 1843, a resource manager 1844, a power manager 1845, a database manager 1846, a package manager 1847, a connectivity manager 1848, a notification manager 1849, a location manager 1850, a graphic manager 1851, and a security manager 1852.

The run time library 1835, for example, may include a library module that a compiler uses in order to add new functions through programming languages while the applications 1870 are executed. The run time library 1835 may perform the management of an input/output, the management of a memory, or a function of an arithmetic calculation.

The application manager 1841, for example, may manage a life cycle of at least one of the applications 1870. The window manager 1842 may manage a GUI resource used in the screen. The multimedia manager 1843 may identify formats for reproducing various media files, and may perform encoding or decoding of media files by using a codec corresponding to each format. The resource manager 1844 may manage resources, such as source codes, memories, or storage spaces of one or more applications 1870.

The power manager 1845, for example, may manage a battery or power by operating in association with a basic input/output system (BIOS), and may provide power information necessary for the operation of the electronic device. The database manager 1846 may manage to create, retrieve, or change a database that is to be used in one or more applications 1870. The package manager 1847 may manage the installation or updating of the applications that are distributed in the form of a package file.

The connectivity manager 1848, for example, may manage a wireless connection, such as Wi-Fi or Bluetooth. The notification manager 1849 may display or output notifications of events, such as received messages, appointments, or proximity notifications, to the user without disturbance. The location manager 1850 may manage location information of the electronic device. The graphic manager 1851 may manage graphic effects to be provided to the user or user interfaces related thereto. The security manager 1852 may provide a general security function required for the system security or user authentication. According to an embodiment of the present disclosure, when the electronic device (e.g., the electronic device 201 or the electronic device 300) adopting a phone call function, the middleware 1830 may further include a telephony manager for managing the functions of a voice call or a video call of the electronic device.

The middleware 1830 may include a middleware module through a combination of various functions of the above-described elements. The middleware 1830 may provide a module that is specialized according to the type of operating system in order to provide differentiated functions.

The API 1860 (e.g., the API 245), for example, may be a group of API programming functions, and may be provided with a different configuration according to an operating system. For example, one set of APIs may be provided to each platform when using Android or iOS, and two or more sets of APIs may be provided to each platform when using Tizen.

The applications 1870 (e.g., the applications 247) include applications that execute functions corresponding to home 1871, a dialer 1872, SMS/MMS 1873, instant messages 1874, a browser 1875, a camera 1876, an alarm 1877, contact 1878, voice dial 1879, e-mail 1880, a calendar 1881, a media player 1882, an album 1883, a clock 1884, healthcare (e.g., measuring the amount of exercise or blood glucose level), provision of environmental information (e.g., providing atmospheric pressure, humidity, or temperature information).

According to an embodiment of the present disclosure, the browser 1875 may display the accessed data in the form of a web page through each of a plurality of windows. For example, the browser 1875 may display a window manager screen (e.g., a multi-tap screen), and the multi-tap screen may include thumbnail images that are made by capturing web pages that are most recently displayed through each window.

According to an embodiment of the present disclosure, the applications 1870 may include an application that supports the exchange of information between the electronic device 201 or 300 and external electronic devices 202 or 204 (hereinafter, "information-exchange application"). The information-exchange application, for example, may include a notification relay application for relaying specific information to the external electronic devices, or a device management application for managing the external electronic devices.

For example, the notification relay application may include a function of transferring notification information generated in other applications {e.g., the SMS/MMS application, the e-mail application, the healthcare application, the scheduling (or planar) application, the alarm application, or the environmental information application} of the electronic device to the first electronic device 202 or the second electronic device 204). In addition, the notification relay application, for example, may receive notification information from the external electronic device to then provide the same to the user.

The device management application, for example, may manage (e.g., install, delete, or update) one or more functions (e.g., turning on and off the external electronic device (or some elements) or adjusting the brightness (or resolution) of a display) of the external electronic device 202 or 204 that communicates with the electronic device, applications executed in the external electronic device, or services (e.g., a phone call service or a messaging service) provided by the external electronic device.

According to an embodiment of the present disclosure, the applications 1870 may include applications that are designated according to the attribute (e.g., the healthcare application of a mobile medical device) of the external electronic device. The applications 1870 may include applications that are received from the server 206, the first peripheral electronic device 202, or the second peripheral electronic device 204). The applications 1870 may include preloaded applications or third party applications that can be downloaded from a server. The names of the components of the program module 1810 of the illustrated embodiment of the present disclosure may be changed according to the type of operating system.

According to an embodiment of the present disclosure, at least some of the programming module 1810 may be embodied as software, firmware, hardware, or a combination of at least two of them. At least some of the program module 1810 may be implemented (e.g., executed) by, for example, the processor 210. At least some of the program module 1810 may include, for example, a module, a program, a routine, a set of instructions, and/or a process for performing one or more functions.

The term "module", as used herein, may, for example, refer to a unit including one of hardware, software, and firmware or a combination of two or more of them. The term "module" may be interchangeably used with, for example, the terms "unit", "logic", "logical block", "component", and "circuit". The term "module" may refer to a minimum unit of an integrated component element or a part thereof. The term "module" may refer to a minimum unit for performing one or more functions or a part thereof. The term "module" may refer to an element that is mechanically or electronically implemented. For example, a module according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to an embodiment of the present disclosure, at least some of the devices (e.g., modules or functions thereof) or the method (for example, operations) according to the present disclosure may be implemented by a command stored in a computer-readable storage medium in a programming module form. The instruction, when executed by the processor 220, may cause the one or more processors to execute the function corresponding to the instruction. The computer-readable storage medium may be, for example, the storage unit 340.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), etc. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

According to the electronic device and the method of controlling the execution of the application in the electronic device, according to embodiments of the present disclosure, even though the execution of the application is terminated according to the state of the electronic device, the application data at the time of the termination may be transmitted to one or more peripheral devices so that the application that has been terminated in the electronic device can be re-executed in order to thereby identify the application data that was in progress at the time of the termination.

Any of the modules or programming modules according to embodiments of the present disclosure may include at least one of the above described elements, exclude some of the elements, or further include other additional elements. The operations performed by the modules, programming module, or other elements according to embodiments of the present disclosure may be executed in a sequential, parallel, repetitive, or heuristic manner. Further, some operations may be executed according to another order or may be omitted, or other operations may be added.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. An electronic device comprising:
    a display;
    a communication unit; and
    a controller configured to:
    determine whether the electronic device satisfies a condition for a termination of a first application while the first application is in progress,
    in response to the determination that the electronic device satisfies the condition for the termination of the first application, identify one or more external electronic devices related to the first application,
    in response to the identification of the one or more external electronic devices, identify at least one external electronic device to which data of the first application are to be transmitted among the one or more external electronic devices, wherein the data include data for an activity information of the first application at a time point when the electronic device satisfies the condition for the termination of the first application, and
    in response to the identification of the at least one external electronic device, transmit, through the communication unit, the data of the first application to the at least one identified external electronic device with an instruction configured to control the at least one selected external electronic device to process the transmitted data of the first application and to display a second execution screen including a first execution screen of the first application that has been displayed on the display at the time point when the electronic device satisfies the condition for the termination of the first application, based on the transmitted data.

2. The electronic device of claim 1, wherein the controller is further configured to:
    determine, as a state of the electronic device, at least one of a remaining amount of a battery of the electronic device, a temperature of the electronic device, and a mounting state of an accessory of the electronic device that processes the data, and
    terminate the first application according to the state of the electronic device.

3. The electronic device of claim 1,
    wherein the data of the first application include at least one of information indicating whether the first application is executed in a background, execution file information, input data information, information on an activity to be called, and access uniform resource locator (URL) information, for each piece of the stored data.

4. The electronic device of claim 3, wherein when the execution file information is contained in the data of the first application, the controller is further configured to identify, as the at least one external electronic device to which the data of the first application are to be transmitted, a first electronic device that stores a file corresponding to the execution file information from among the one or more identified external electronic devices, wherein when the first electronic device is not identified, the controller is further configured to transmit, to a second electronic device that is connected through an account of the electronic device from among the one or more identified external electronic devices, information that instructs the second electronic device to download the file through the account of the electronic device and to execute the file.

5. The electronic device of claim 3, wherein when the controller identifies information contained in the data of the first application and determines that the first application is running in a background, the controller is further configured to identify, as the at least one external electronic device to which the data of the first application are to be transmitted, a third electronic device that has a lowest power consumption for processing the data of the first application from among the one or more identified external electronic devices.

6. The electronic device of claim 2, wherein the controller is further configured to identify, when the first application is terminated according to the mounting state of the accessory that processes the data, as the at least one external electronic device to which the data of the first application are to be transmitted, a fourth electronic device that is able to output the data.

7. The electronic device of claim 1, wherein the controller is further configured to:
    broadcast a signal including a request for information indicating whether the data of the first application are able to be processed, and identify, as the at least one external electronic device to which the data of the first application are to be transmitted, a fifth electronic device that responds to the signal.

8. An electronic device comprising,
a display;
a communication unit; and
a controller configured to,
receive data of a first application from an external electronic device through the communication unit, wherein the first application is run on the external electronic device until a time point when the external electronic device satisfies a condition for a termination of the first application, wherein the data include data for an activity information at the time point when the electronic device satisfies the condition for the termination of the first application,
in response to the reception of the data, execute a second application that is related to the received data of the first application,
process the received data of the first application on the executed second application, and
display, on the display, a second execution screen of the second application, including a first execution screen of the first application that has been displayed on the external electronic device at the time point when the electronic device satisfies the condition for the termination of the first application, based on the received data,
wherein the received data of the first application is received from the external electronic device according to a state of the external electronic device satisfying the condition for the termination of the first application.

9. The electronic device of claim 8,
wherein the controller is further configured to:
display, on the display, a message that requests input indicating whether the data of the first application received from the external electronic device are to be executed, and
when a response to the message is received, determine whether the data of the first application received from the external electronic device are to be executed.

10. The electronic device of claim 8, wherein controller is further configured to, if a signal that asks whether the data of the first application are able to be executed is received from the external electronic device, and control the communication unit to transmit a response to the broadcast signal to the external electronic device according to whether an application capable of processing the data of the first application is installed in the electronic device.

11. A method for controlling the execution of a first application in an electronic device, the method comprising:
executing the first application on the electronic device;
determining whether the electronic device satisfies a condition for a termination of the executed application while the first application is in progress,
in response to the determination that the electronic device satisfies the condition for the termination of the first application, identifying one or more external electronic devices related to the executed application;
in response to the identification of the one or more external electronic devices, identifying at least one external electronic device to which data of the first application are to be transmitted among the one or more external electronic devices, wherein the data include data for an activity information of the first application at a time point when the electronic device satisfies the condition for the termination of the first application, and
in response to the identification of the at least one external electronic device, transmitting the data of the first application to the at least one identified external electronic device with an instruction configured to control the at least one selected external electronic device to process the transmitted data of the first application and to display a second execution screen including a first execution screen of the first application that has been displayed on a display of the electronic device at the time point when the electronic device satisfies the condition for the termination of the first application, based on the transmitted data.

12. The method of claim 11, further comprising terminating the first application according to a state of the electronic device, wherein the state of the electronic device includes at least one of a remaining amount of a battery of the electronic device, a temperature of the electronic device, or a mounting state of an accessory of the electronic device that processes the data.

13. The method of claim 11,
wherein the data of the first application includes at least one of information indicating whether the first application is executed in a background, execution file information, input data information, information on an activity to be called, and access uniform resource locator (URL) information, for each piece of the stored data.

14. The method of claim 13, further comprising, selecting, when the execution file information is contained in the data of the first application, as the at least one external electronic device to which the data of the first application are to be transmitted, a first electronic device that stores a file corresponding to the execution file information from among the one or more identified external electronic devices, when the first electronic device is not identified, transmitting, to a second electronic device that is connected through an account of the electronic device from among the one or more identified external electronic devices, information that instructs the second electronic device to download the file through the account of the electronic device, and to execute the file.

15. The method of claim 13, further comprising:
identifying information contained in the data of the first application to determine that the first application is running in a background; and
selecting, as the at least one external electronic device to which the data of the first application are to be transmitted, a third electronic device that has a lowest power consumption for processing the data of the first application from among the one or more identified external electronic devices.

16. The method of claim 12, further comprising: identifying, when the first application is terminated according to the mounting state of the accessory that processes the data, as the at least one external electronic device to which the data of the first application are to be transmitted, a fourth electronic device that is able to output the data.

17. The method of claim 11, further comprising:
broadcasting a signal including a request for information indicating whether the data of the first application are able to be processed; and identifying, as the at least one external electronic device to which the data of the first application are to be transmitted, a fifth electronic device that responds to the signal.

18. A method for controlling the execution of a second application in an electronic device, the method comprising:
receiving data of a first application from an external electronic device, wherein the first application is run on the external electronic device until a time point when the external electronic device satisfies a condition for a termination of the first application, wherein the data include data for an activity information at the time point when the external electronic device satisfies the condition for the termination of the first application;
in response to the reception of the data, executing the second application that is related to the received data of the first application;
in response to the execution of the second application, processing the received data of the first application on the second application, and
in response to the processing of the received data, displaying a second execution screen of the second application, including a first execution screen of the first application that has been displayed on the external electronic device at the time point when the external electronic device satisfies the condition for the termination of the first application, based on the received data,
wherein the received data of the first application is received from the external electronic device according to a state of the external electronic device satisfying the condition for the termination of the first application.

19. The method of claim 18, further comprising:
displaying a message that requests input indicating whether the data of the first application received from the external electronic device are to be executed; and
when a response to the message is received, determining whether the data of the first application received from the external electronic device are to be executed.

20. The method of claim 18, further comprising
receiving, from the external electronic device, a signal that requests information indicating whether the data of the first application are able to be executed in the electronic device; and
transmitting a response to the broadcast signal to the external electronic device according to whether an application capable of processing the data of the first application is installed in the electronic device.

* * * * *